United States Patent
Robertson et al.

(10) Patent No.: US 10,042,512 B2
(45) Date of Patent: *Aug. 7, 2018

(54) METHOD AND APPARATUS FOR PROVIDING A THREE-DIMENSIONAL TASK GALLERY COMPUTER INTERFACE

(71) Applicant: Microsoft Technology Licensing, LLC, Redmond, WA (US)

(72) Inventors: George G. Robertson, Seattle, WA (US); Mary P. Czerwinski, Woodinville, WA (US); Kenneth P. Hinckley, Kirkland, WA (US); Kirsten C. Risden, Bothell, WA (US); Daniel C. Robbins, Seattle, WA (US); Maarten R. van Dantzich, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 968 days.

This patent is subject to a terminal disclaimer.

(21) Appl. No.: 14/482,324

(22) Filed: Sep. 10, 2014

(65) Prior Publication Data

US 2015/0058791 A1    Feb. 26, 2015

Related U.S. Application Data

(60) Continuation of application No. 13/037,973, filed on Mar. 1, 2011, now Pat. No. 8,856,687, which is a
(Continued)

(51) Int. Cl.
*G06F 3/048* (2013.01)
*G06F 3/0481* (2013.01)
(Continued)

(52) U.S. Cl.
CPC ........ *G06F 3/04815* (2013.01); *G06F 3/0481* (2013.01); *G06F 3/0482* (2013.01); *G06F 3/04842* (2013.01)

(58) Field of Classification Search
CPC .. G06F 3/0481; G06F 3/04815; G06F 3/0482; G06F 3/04842
See application file for complete search history.

(56) References Cited

U.S. PATENT DOCUMENTS

| | | |
|---|---|---|
| 5,544,295 A | 8/1996 | Capps |
| 5,644,737 A | 7/1997 | Tuniman et al. |

(Continued)

FOREIGN PATENT DOCUMENTS

| | | |
|---|---|---|
| WO | WO9741506 | 11/1997 |
| WO | WO9745782 | 12/1997 |

OTHER PUBLICATIONS

Prosecution History from U.S. Appl. No. 13/037,973, including: Issue Notifaction dated Sep. 17, 2014, Response to Admendment dated Aug. 29, 2014, Response to Notice to File Corrected Application Papers date Aug. 21, 2014, Notice to File Corrected Application Papers dated Aug. 4, 2014, Notice of Allowance dated Jun. 5, 2014, Admendment with RCE dated May 2, 2014, Office Action dated Dec. 2, 2013, Amendment dated Sep. 26, 2013, Office Action dated May 23, 2013, and Application and drawings filed Mar. 1, 2011, 323 pages.

(Continued)

*Primary Examiner* — Thanh Vu
(74) *Attorney, Agent, or Firm* — Christopher J. Volkmann; Kelly, Holt & Christenson, PLLC

(57) ABSTRACT

The present invention provides a three-dimensional user interface for a computer system that allows a user to combine and store a group of windows as a task. The image of each task can be positioned within a three-dimensional (Continued)

environment such that the user may utilize spatial memory in order remember where a particular task is located.

20 Claims, 40 Drawing Sheets

Related U.S. Application Data continuation of application No. 12/413,095, filed on Mar. 27, 2009, now Pat. No. 7,921,376, which is a continuation of application No. 10/912,452, filed on Aug. 5, 2004, now Pat. No. 7,512,902, which is a division of application No. 09/540,069, filed on Mar. 31, 2000, now Pat. No. 6,909,443.

(60) Provisional application No. 60/128,003, filed on Apr. 6, 1999, provisional application No. 60/127,997, filed on Apr. 6, 1999.

(51) Int. Cl.
*G06F 3/0482* (2013.01)
*G06F 3/0484* (2013.01)

(56) References Cited

U.S. PATENT DOCUMENTS

| | | | |
|---|---|---|---|
| 5,724,492 A | | 3/1998 | Matthews, III et al. |
| 5,745,112 A | * | 4/1998 | Hirose ............... G06F 3/0486 715/769 |
| 5,754,809 A | | 5/1998 | Gandre |
| 5,808,613 A | | 9/1998 | Marrin et al. |
| 5,835,692 A | | 11/1998 | Cragun et al. |
| 5,838,326 A | * | 11/1998 | Card ............... G06F 3/04815 715/775 |
| 5,861,885 A | | 1/1999 | Strasnick et al. |
| 5,874,956 A | | 2/1999 | LaHood |
| 5,880,725 A | | 3/1999 | Southgate |
| 5,880,733 A | | 3/1999 | Horvitz et al. |
| 6,002,403 A | * | 12/1999 | Sugiyama ........ G06F 3/04815 715/717 |
| 6,088,032 A | | 7/2000 | Mackinlay |
| 6,094,196 A | | 7/2000 | Berry et al. |
| 6,097,393 A | | 8/2000 | Prouty, IV et al. |
| 6,115,043 A | | 9/2000 | Levine et al. |
| 6,229,542 B1 | * | 5/2001 | Miller ............... G06F 3/04815 715/782 |
| 6,271,842 B1 | | 8/2001 | Bardon et al. |
| 6,313,855 B1 | | 11/2001 | Shuping et al. |
| 6,346,956 B2 | | 2/2002 | Matsuda |
| 6,486,895 B1 | | 11/2002 | Robertson et al. |
| 6,590,593 B1 | | 7/2003 | Robertson et al. |
| 6,628,307 B1 | | 9/2003 | Fair |
| 6,765,567 B1 | | 7/2004 | Roberson et al. |
| 6,909,443 B1 | | 6/2005 | Robertson et al. |
| 7,119,819 B1 | | 10/2006 | Robertson et al. |
| 7,512,902 B2 | | 3/2009 | Robertson et al. |
| 7,921,376 B2 | | 4/2011 | Robertson et al. |
| 8,856,687 B2 | | 10/2014 | Robertson et al. |

OTHER PUBLICATIONS

Prosecution History from U.S. Appl. No. 12/413,095, including: Issue Notification dated Mar. 16, 2011, Notice of Allowance dated Dec. 2, 2010, Preliminary Amendment dated May 14, 2009, Notice to File Corrected Application Papers dated Apr. 13, 2009, and Application and Drawings filed Mar. 27, 2009, 133 pages.
Prosecution History for U.S. Appl. No. 09/540,069, including: Notice of Allowance dated Oct. 4, 2004, Amendment dated Jul. 12, 2004, Amendment dated Apr. 12. 2004, Office Action dated Jan. 14, 2004, Amendment dated Oct. 20, 2003, Office Action dated Jul. 16, 2003, Amendment dated Apr. 30, 2003, Office Action dated Feb. 19, 2003, Amendment dated Nov. 25, 2002 Office Action dated Sep. 11, 2002, and Application and Drawings filed Mar. 31, 2000. 231 pages.
Mine, Mark, "Summary of Video Entitled CHIMP System", University of North Carolina, 1996, 1 page.
Robertson et al., "Information visualization using 3D interactive animation." Communications of the ACM 36.4 (1993): 57-71.
Henderson et al., "Rooms: the use of multiple virtual workspaces to reduce space contention in a window-based graphical user interface." ACM Transactions on Graphics (TOG) 5.3 (1986): 211-243.
Feiner, Steven, et al. "Windows on the world: 2D windows for 3D augmented reality." Proceedings of the 6th annual ACM symposium on User interface software and technology. ACM, 1993. 13 pages.
Robertson, George, et al. "Data mountain: using spatial memory for document management." Proceedings of the 11th annual ACM symposium on User interface software and technology. ACM, 1998. 12 pages.
Morris, James H., et al. "Andrew: A distributed personal computing environment." Communications of the ACM 29.3 (1986): 184-201.
Kandogan et al., "Elastic Windows: evaluation of multi-window operations." Proceedings of the ACM SIGCHI Conference on Human factors in computing systems, ACM, 1997, 10 pages.
Czerwinski, Mary, et al, "The contribution of thumbnail image, mouse-over text and spatial location memory to web page retrieval in 3D," Proc. Interact. vol. 99. 1999. 12 pages.
Bukowski et al., "Object associations: a simple and practical approach to virtual 3D manipulation," Proceedings of the 1995 symposium on Interactive 3D graphics. ACM, 1995. 8 pages.
Ware et al., "Fish tank virtual reality," Proceedings of the INTERACT'93 and CHI'93 conference on Human Factors in computing systems, ACM. 1993. 8 pages.
Stoakley et al., "Virtual reality on a WIM: interactive worlds in miniature." Proceedings of the SIGCHI conference on Human factors in computing systems. ACM Press/Addison-Wesley Publishing Co., 1995. 11 pages.
Sellen et al., "The role of visual and kinesthetic feedback in the prevention of mode errors." Proceedings of the IFIP TC13 Third Interational Conference on Human-Computer Interaction. North-Holland Publishing Co., 1990. 9 pages.
Pausch, Randy, et al. "Navigation and locomotion in virtual worlds via flight into hand-held miniatures," Proceedings of the 22nd annual conference on Computer graphics and interactive techniques. ACM, 1995. 2 pages.
Hinckley, Ken, et al. "Passive real-world interface props for neurosurgical visualization." Proceedings of the SIGCHI conference on Human factors in computing systems. ACM, 1994. 7 pages.
Elvins et al., "Worldlets—3D thumbnails for wayfinding in virtual environments." Proceedings of the 10th annual ACM symposium on User interface software and technology. ACM, 1997. 12 pages.
Conner, Brookshire D., et al. "Three-dimensional widgets." Proceedings of the 1992 symposium on Interactive 3D graphics. ACM, 1992, 8 pages.
Butterworth, Jeff, et al. "3DM: A three dimensional modeler using a head-mounted display." Proceedings of the 1992 symposium on Interactive 3D graphics. ACM, 1992. 6 pages.
Billinghurst; Mark, et al, "3D palette: a virtual reality content creation tool." Proceedings of the ACM symposium on Virtual reality software and technology. ACM, 1997. 4 pages.
Bederson, Benjamin B., et al. "Local tools: An alternative to tool palettes," Proceedings of the 9th annual ACM symposium on User interface software and technology, ACM, 1996, 4 pages.
"Practical 3D User Interface Design: Siggraph '96, " Organizer: Daniel C. Robbins, Microsoft Corporation, (1996). 30 pages.
Gavron, Jacquelyn, and Joseph Moran. How to Use Microsoft Windows NT 4 Workstation, Ziff Davis Press, 1996. 4 pages.
Mine et al., "Moving objects in space: exploiting proprioception in virtual-environment interaction." Proceedings of the 24th annual conference on Computer graphics and interactive techniques. ACM Press/Addison-Wesley Publishing Co., 1997. 8 pages.
Darken et al., "Wayfinding strategies and behaviors in large virtual worlds." Proceedings of the SIGCHI conference on Human factors in computing systems. ACM, 1996. 8 pages.

(56) References Cited

OTHER PUBLICATIONS

Prosecution History for U.S. Appl. No. 09/540,744, including: Amendment dated Mar. 9, 2005, Interview Summary dated Mar. 9, 2005, and Application and Drawings filed Mar. 31, 2000, 141 pages.

* cited by examiner

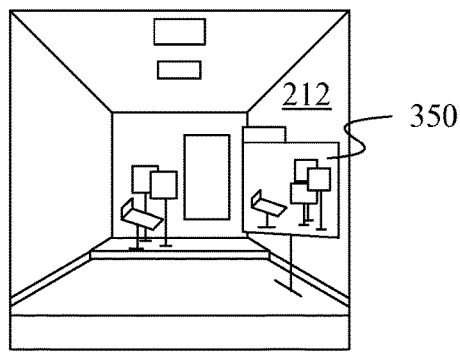 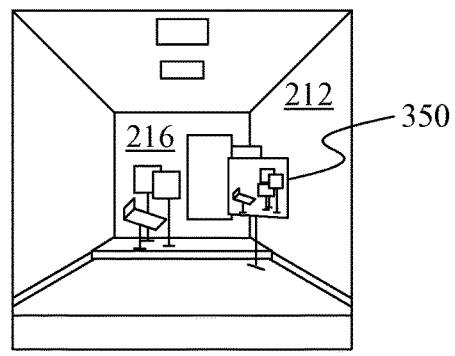
FIG. 8A  FIG. 8B
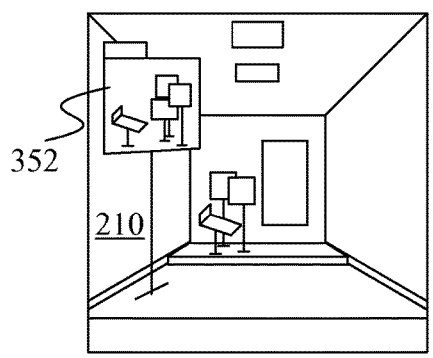 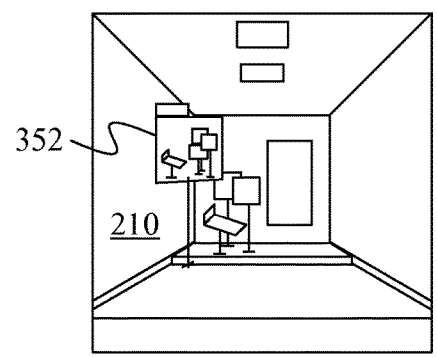
FIG. 9A  FIG. 9B
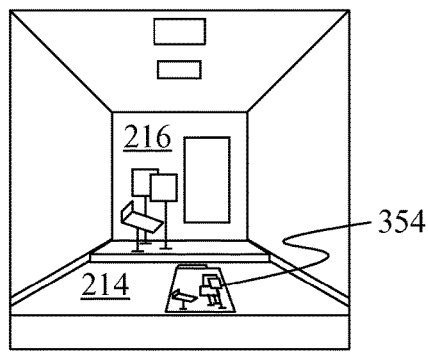 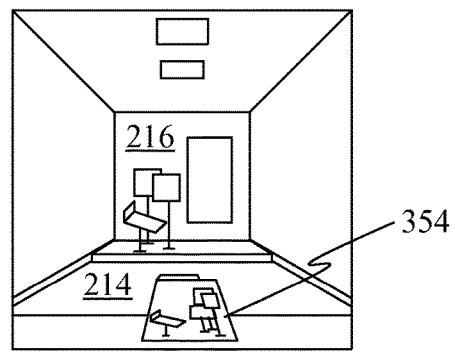
FIG. 10A  FIG. 10B

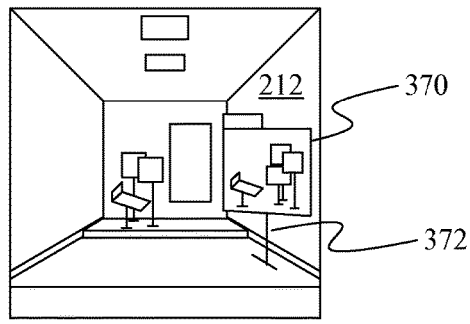
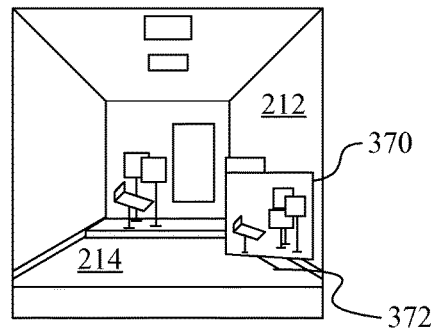
FIG. 12A    FIG. 12B
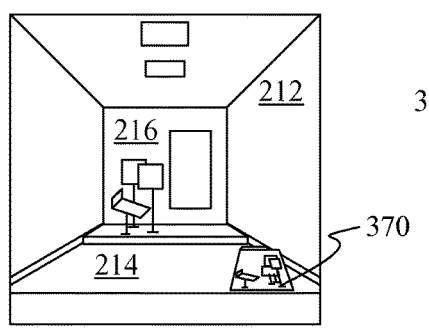
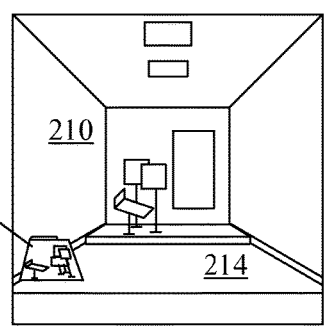
FIG. 12C    FIG. 12D
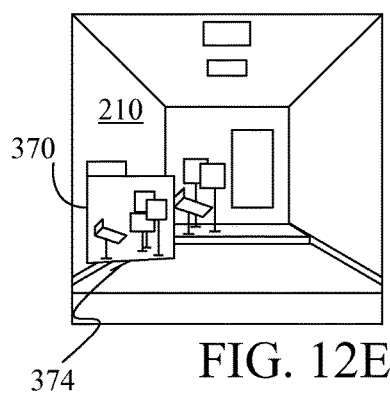
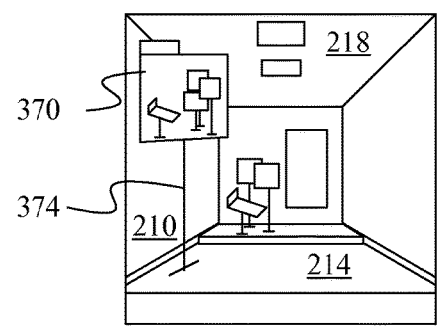
FIG. 12E    FIG. 12F

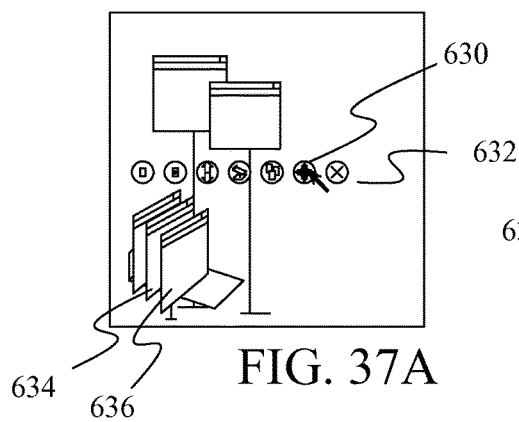
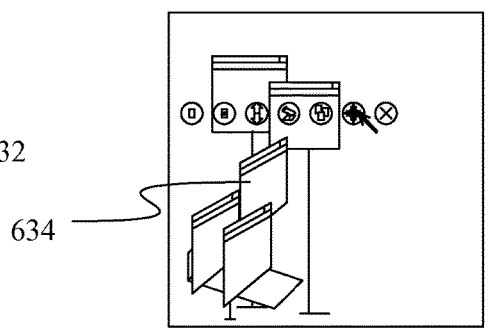
FIG. 37A    FIG. 37B
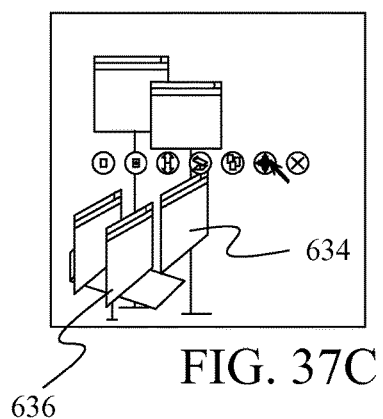
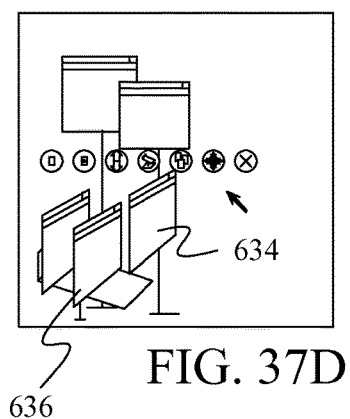
FIG. 37C    FIG. 37D
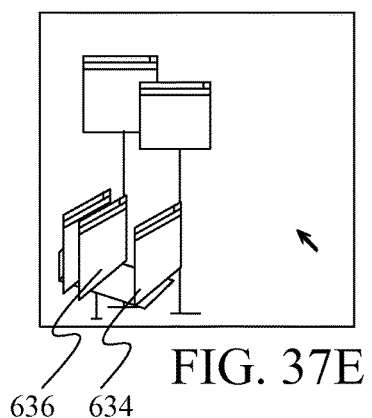
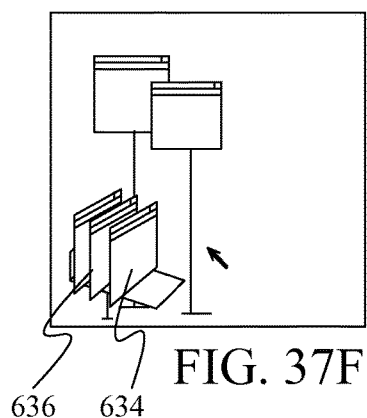
FIG. 37E    FIG. 37F

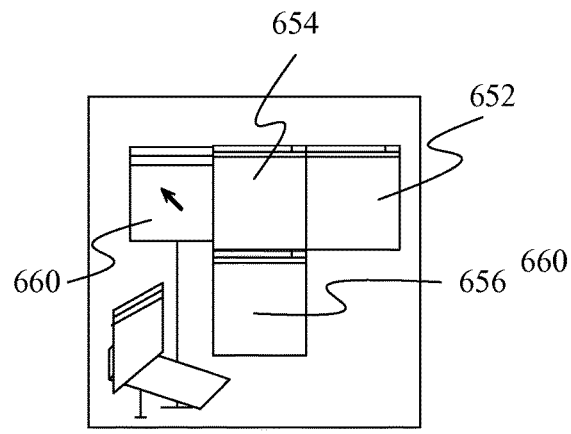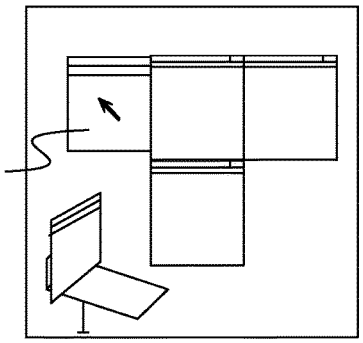
FIG. 38G          FIG. 38H
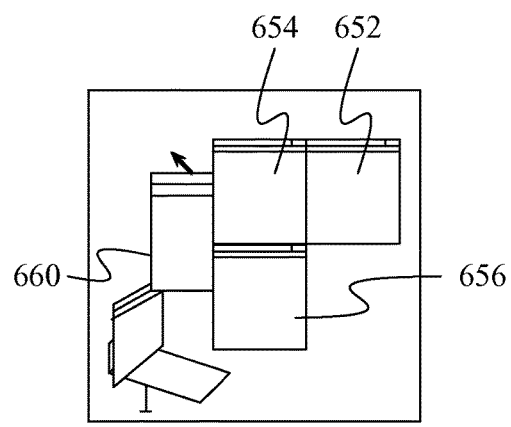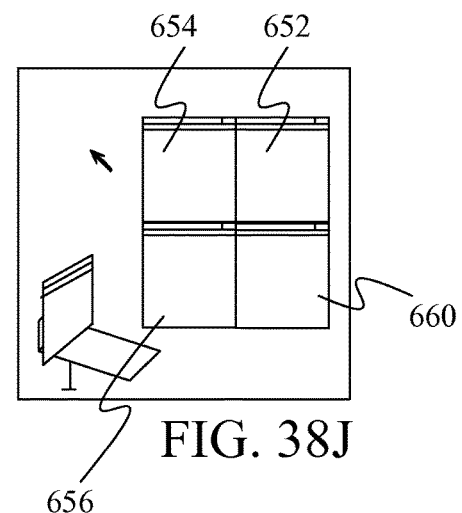
FIG. 38I          FIG. 38J

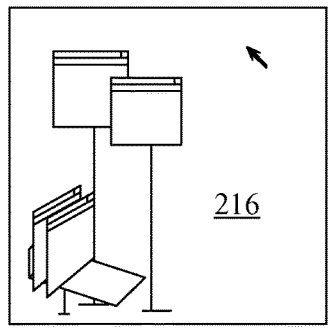
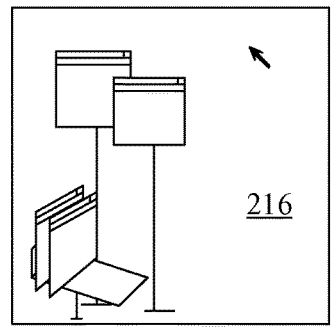
FIG. 43A                FIG. 44A
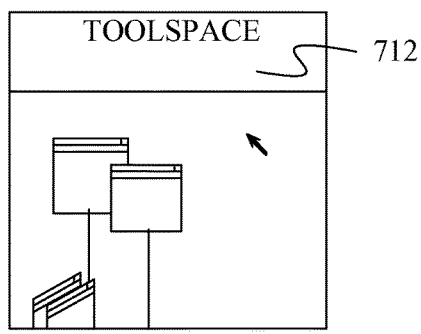
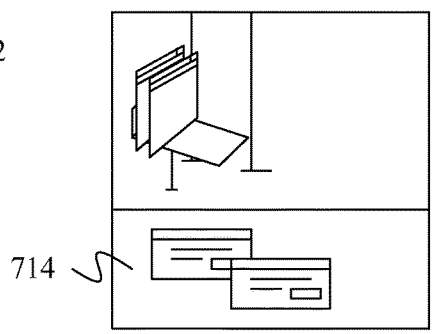
FIG. 43B                FIG. 44B
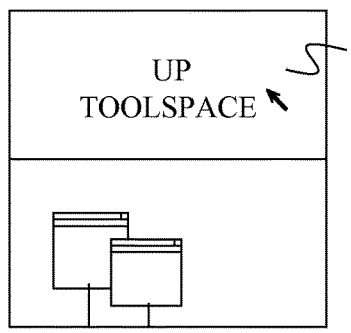
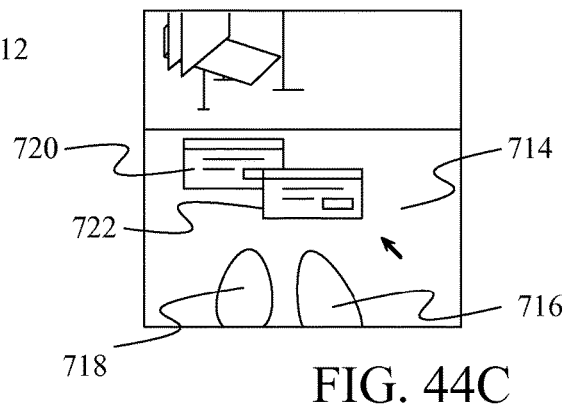
FIG. 43C                FIG. 44C

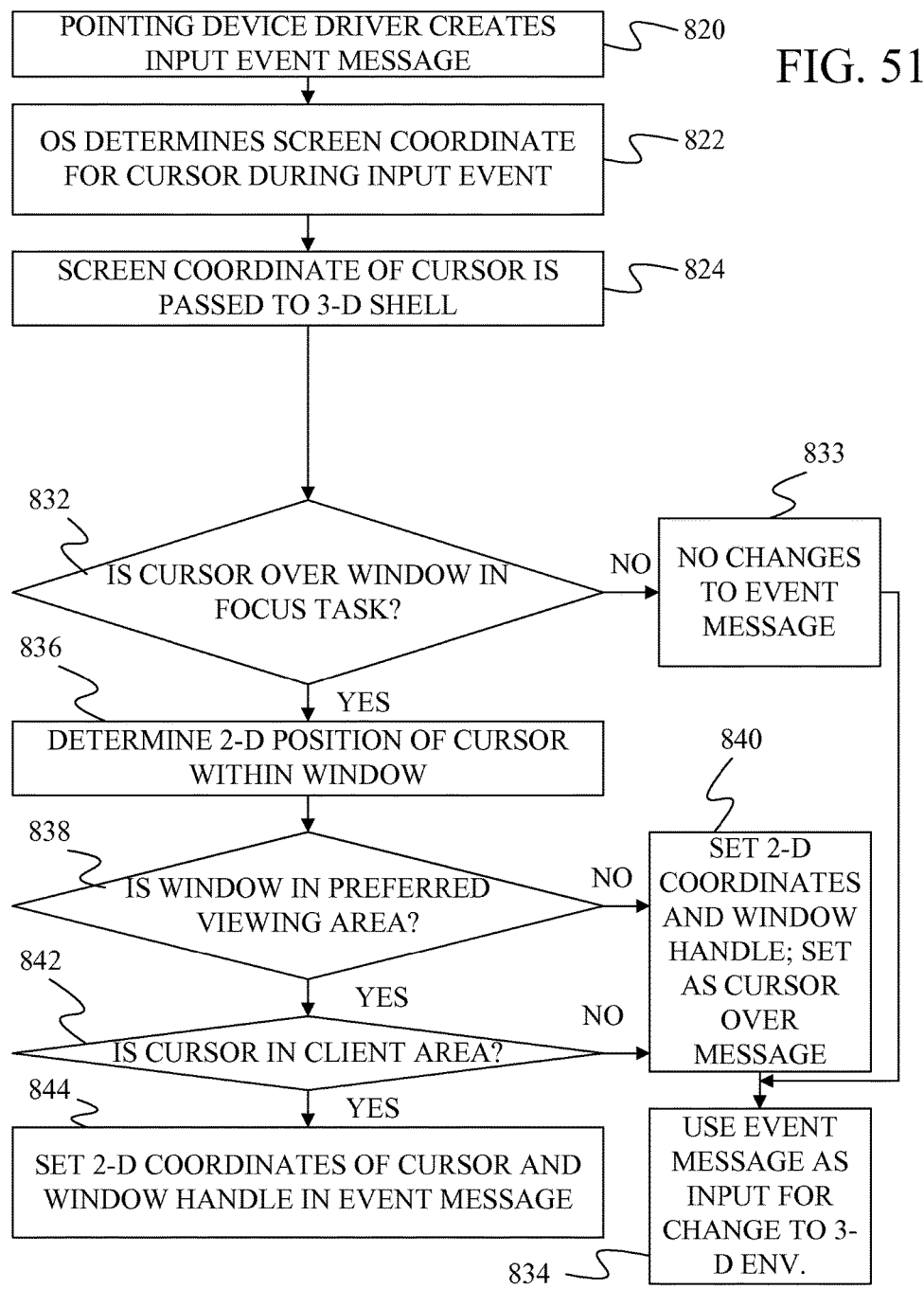

METHOD AND APPARATUS FOR PROVIDING A THREE-DIMENSIONAL TASK GALLERY COMPUTER INTERFACE

REFERENCE TO RELATED APPLICATIONS

The present application is a continuation of and claims priority from U.S. patent application Ser. No. 13/037,973, filed Mar. 1, 2011, which was a continuation of and claims priority from U.S. patent application Ser. No. 12/413,095, filed Mar. 27, 2009, which was a continuation of and claimed priority from U.S. patent application Ser. No. 10/912,452, filed Aug. 5, 2004, now U.S. Pat. No. 7,512,902, which was a Divisional of and claimed priority from U.S. patent application Ser. No. 09/540,069 filed Mar. 31, 2000, now U.S. Pat. No. 6,909,443, which claimed priority from U.S. Provisional Applications having Ser. Nos. 60/128,003 and 60/127,997, both filed on Apr. 6, 1999. The contents of these applications is hereby incorporated by reference in their entirety.

The present application is also related to U.S. Pat. Nos. 6,765,567; 6,590,593; and 7,119,819, which are all owned by a common assignee with the present application.

BACKGROUND OF THE INVENTION

The present invention relates to computer interfaces. In particular, the present invention relates to three-dimensional computer interfaces.

Many computer systems display images produced by different applications within different windows on a computer monitor. Examples of operating systems that generate such windows include Windows 95®, Windows 98®, Windows NT®, and Windows® 2000 from Microsoft Corporation. In such systems, users are able to interact with multiple applications. For example, a user may have one window open for Word 97 from Microsoft Corporation and a second window open for Excel from Microsoft Corporation.

It has been observed that computer users open different windows for different tasks and organize the display of their windows differently for different tasks. For example, when a user performs the task of writing a computer program, they may have two windows open in a split screen format, with one window containing a program editor and the other window containing the interface generated by the program. However, when the user is performing a task such as sending e-mails, the user may have the mail window open so that it takes up most of the screen and a scheduling application open in a small part of the screen.

Since each task may be associated with different windows in different layouts, one system of the prior art has allowed the user to associate the layout of particular windows with particular tasks. In this prior art system, such layouts were referred to as rooms, even though the layout provided a two-dimensional view of the windows as seen on most current two-dimensional displays. The user could select one of the rooms to work with by picking the room from a grid of icons representing each of the available rooms. In this prior art system, the rooms are placed in the grid by the system. This forces the user to scan the grid in order to find the room that they wish to work with. Such a layout makes the use of the room system difficult for most users.

SUMMARY OF THE INVENTION

The present invention provides a three-dimensional user interface for a computer system that allows a user to combine and store a group of windows as a task. The image of each task can be positioned within a three-dimensional environment such that the user may utilize spatial memory in order remember where a particular task is located.

BRIEF DESCRIPTION OF THE DRAWINGS

FIGS. 8A-8B show selected frames from the animated movement of a task on the right side wall of the task gallery.

FIGS. 9A-9B show selected frames from the animated movement of a task on the left side wall of the task gallery.

FIGS. 10A-10B show selected frames from the animated movement of a task on the floor of the task gallery.

FIGS. 12A-12I show selected frames from the animated movement of a task as it is moved between the walls, ceiling and floor of the task gallery.

FIGS. 37A-37F show selected frames from the dragging and animated movement of a window within the ordered stack using button icons.

FIGS. 38A-38J show selected frames from the animated movement associated with adding windows to the primary viewing location.

FIGS. 43A-43C show selected frames from an animated movement associated with glancing at the up tool space.

FIGS. 44A-44C show selected frames from an animated movement associated with glancing at the down tool space.

FIG. 51 is a flow diagram for redirecting pointing device input messages.

DETAILED DESCRIPTION OF ILLUSTRATIVE EMBODIMENTS

Figure 1:
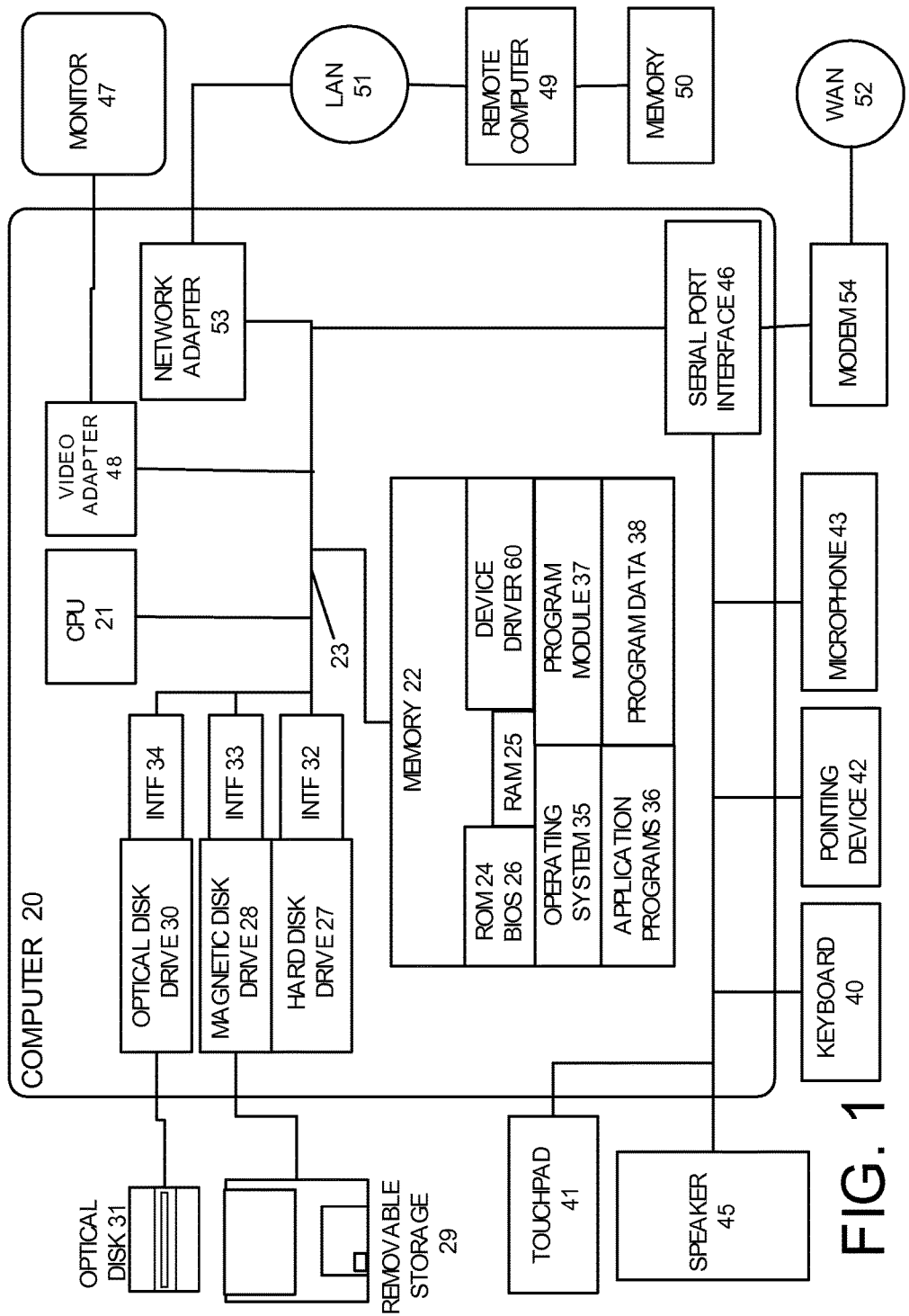
FIG. 1 is a plan view of a general computing environment in which embodiments of the invention may be practiced.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Under the present invention, a three-dimensional user interface is generated that allows a user to manipulate and use windows by associating the windows with separate tasks. In the description below, this three-dimensional user interface is referred to alternatively as a task gallery, a data hallway, and a data mine. Generally, the three-dimensional user interface gives the user the perception that they are within a hallway or gallery consisting of a number of aligned hallway sections that end with a stage or display area at an end wall.

Task Gallery Layout

Figure 2:
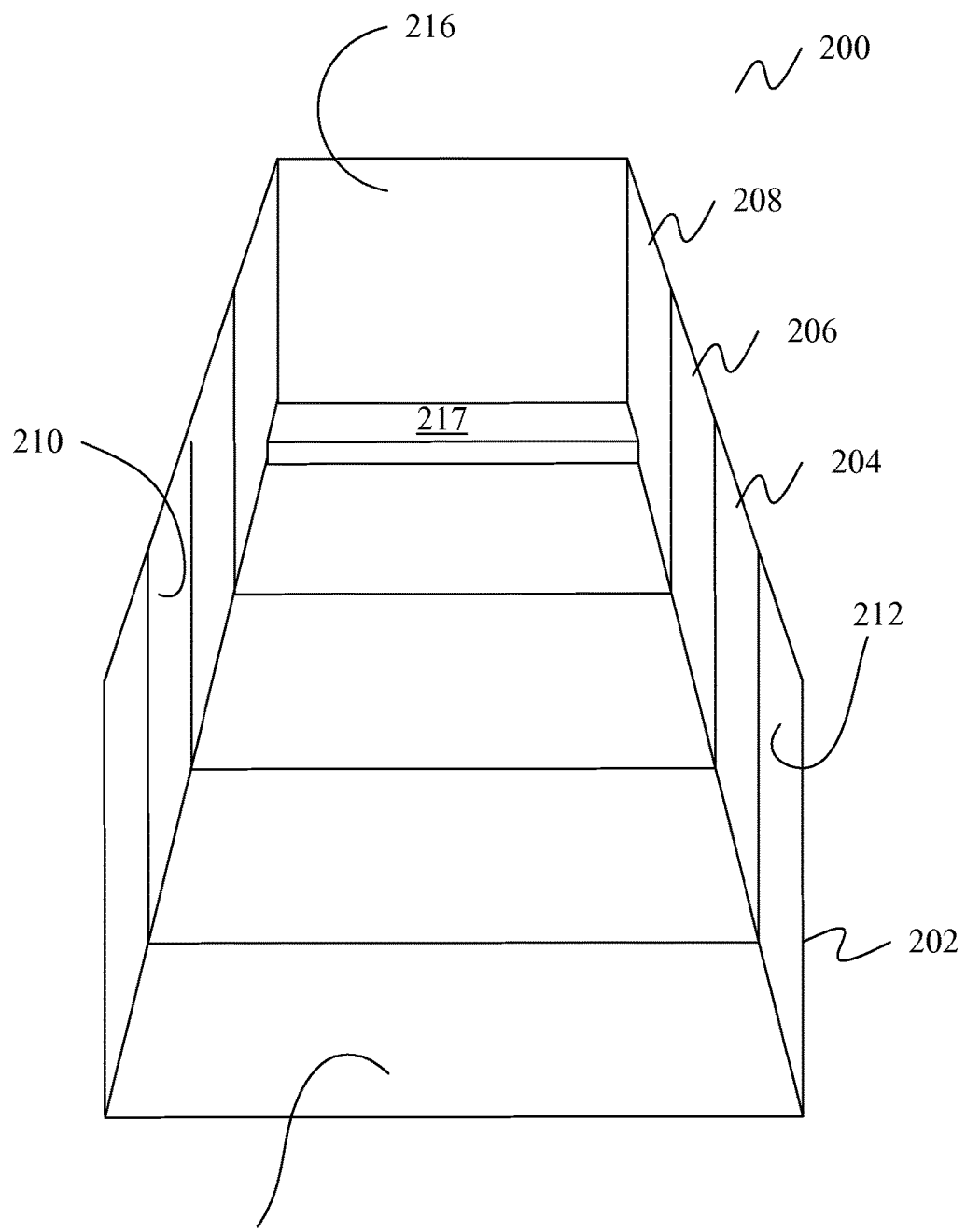
FIG. 2 is a top-back perspective view of a task gallery display of an embodiment of the present invention.

FIG. 2 provides a top back perspective view of a task gallery 200 of one embodiment of the present invention with the ceiling in the gallery removed to expose the remainder of the gallery. Task gallery 200 includes rooms 202, 204, 206 and 208 that each have walls forming a portion of side walls 210 and 212, and floors that form a portion of gallery floor 214. Room 208 also includes an end wall 216 and a stage 217.

Figure 3:
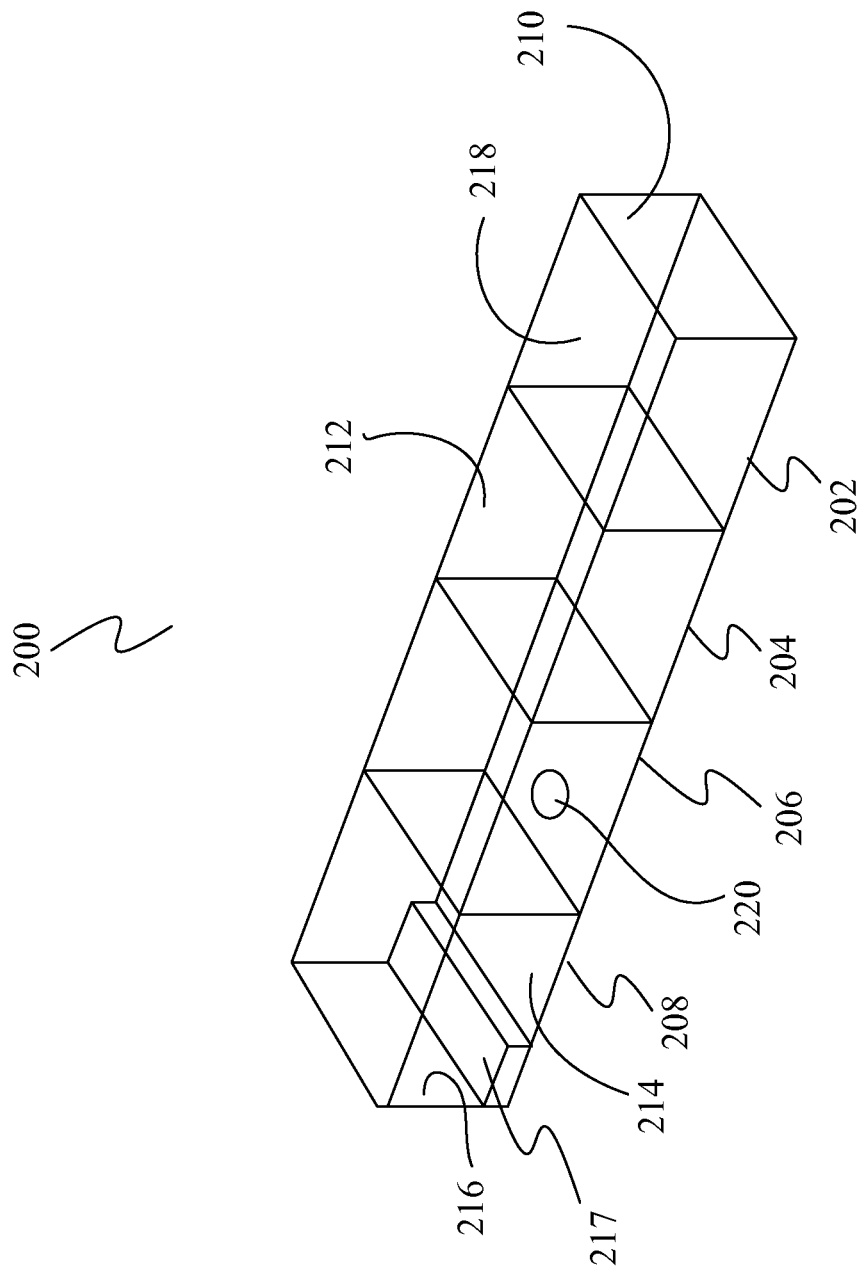
FIG. 3 is a side perspective view of the task gallery of FIG. 2.

FIG. 3 provides a perspective view from the side of task gallery 200 of FIG. 2. In FIG. 3, ceiling 202 of task gallery 200 is shown connecting side walls 210, and 212. Although only four rooms, 202, 204, 206 and 208 are shown in FIGS. 2 and 3, many task galleries of the present invention are indefinitely extendable by the user. In one embodiment, the user interface automatically generates additional rooms as the user moves objects out of the last existing room or creates new objects that necessitate the creation of new rooms. In such embodiments, the interface also removes back-end rooms if they no longer contain objects. Thus, the task gallery may consist of as few as one room.

When the user is using task gallery 200 of FIG. 3, the three-dimensional image provided to the user is based upon the combination of the location of a virtual body, representing the user's body in the task gallery and the orientation of a virtual head or camera representing the user's head in the task gallery. The user's virtual head is able to rotate independently of the direction the virtual body is facing, so that the user can glance up and down and to the sides as discussed further below.

Figure 4:
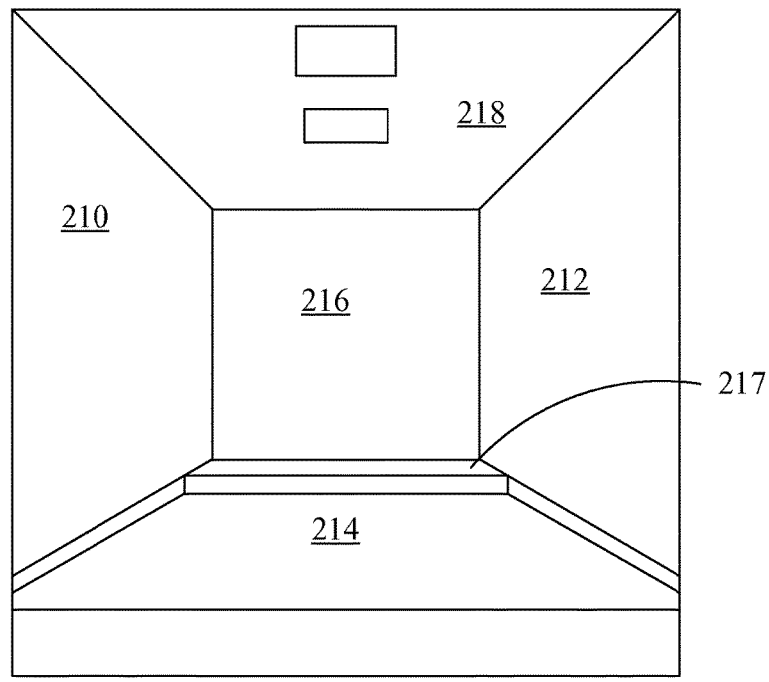
FIG. 4 is a screen image of a task gallery user interface generated under an embodiment of the present invention.

FIG. 4 provides a screen image representing the view from the virtual camera when the virtual camera is directed toward end wall 216 and the virtual body is positioned at a location 220 in FIG. 3. Thus, in FIG. 4, end wall 216 and stage 217 are shown as being some distance from the user and floor 214, ceiling 218, and walls 210 and 212 can be seen.

In some embodiments, each segment of the hallway is decorated so as to make it distinct from other segments of the hallway. For example, the walls, floor, and ceiling of a segment may be decorated with unique texture maps to make the hallway segment look unique. This helps to enhance the user's spatial memory of locations for storing or retrieving objects. Segments of the hallway may also be decorated with three-dimensional landmarks such as a virtual chair, a chandelier, or other decoration, to make the hallway segment further visually distinct and memorable.

Container Objects

In one embodiment of the invention, the user interface program that generates the three-dimensional task gallery is programmed using an object-oriented programming language. Under such an embodiment, a container object is defined that includes a property of containing other objects. The objects that are contained within a container object are known as containables. A displayed item associated with a containable object has its appearance and movement defined in part by the container object that holds the containable object.

Figure 5:
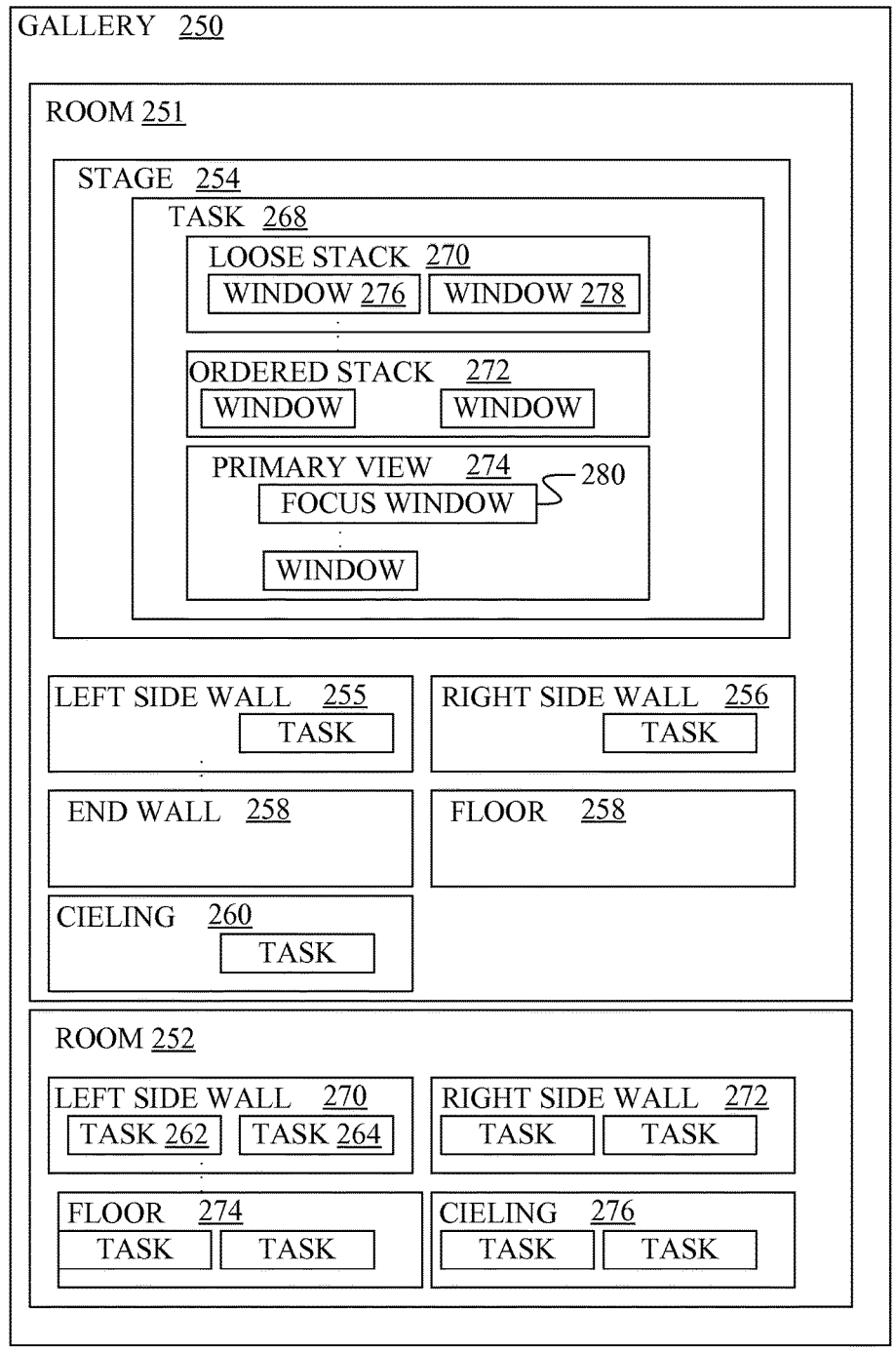
FIG. 5 is a diagram of a container object hierarchy under an embodiment of the invention.

In one embodiment, the task gallery is represented by a container object that contains room objects. Each room object contains two side wall objects, a floor object and a ceiling object. Each of these containable objects is in turn a container object that contains further objects. This hierarchy is shown in FIG. 5 where task gallery object 250 contains room objects 251 and 252. Room object 251 contains stage object 254, left side wall object 255, right side wall object 256, end wall object 257, floor object 258, and ceiling object 260. Room object 252 contains left side wall object 270, right side wall object 272, floor object 274, and ceiling object 276. When using a task gallery, the user may add task objects to the wall, floor or ceiling objects of a room. For example, task objects 262, and 264 of FIG. 5 have been added to left side wall object 270 of room object 252. When a task object is added to a structural object such as a left side wall object, the image associated with the task object appears bound to the image of the structure associated with the structural object.

Figure 6:
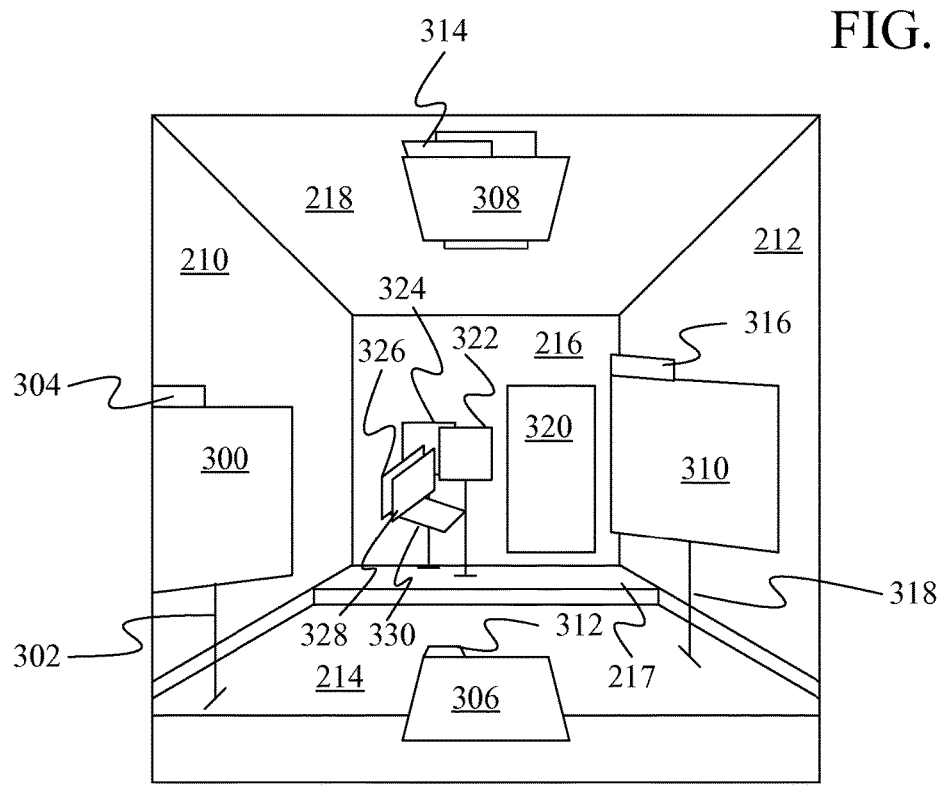
FIG. 6 is a screen image of the task gallery of FIG. 4 populated by tasks and windows.

For example, FIG. 6 shows that a task image 300 appears near left side wall 210 of room 208 when the task object associated with task image 300 is contained within the left side wall object of the room.

The appearance of task 300 in FIG. 6 is defined in part by the fact that the task object representing task 300 is contained within the left side wall object. In particular, task 300 appears on a stand 302 and has a title bar 304 placed along its top edge. The stand helps the user determine the three-dimensional location of the particular task. In addition, task 300 does not lie flat against wall 210, but instead extends out into the hallway of the task gallery.

In FIG. 5, task objects are shown in right side wall object 252, and ceiling object 260 of room object 251 and floor object 274 of room 252. Examples of images associated with such task objects are shown in FIG. 6 as right side wall task 310, ceiling task 308, and floor task 306, respectively.

In the embodiment of FIG. 6, floor task 306 appears with the top of the task closer to the end wall than to the user. In addition, a title bar 312 appears on the top edge of the task and the top edge is raised slightly from floor 214 to provide a better view of the task to the user.

Ceiling task 308 has its top edge closer to the user than to end wall 216. The top edge of task 308 is covered by a title bar 314 and the lower edge of task 308 is suspended slightly from ceiling 218 to provide a better view of the task image. All of these arrangements may be created or changed by the user, at will, to provide arrangements optimized for particular uses.

Right side wall task 310 appears on a stand 318 and has a title bar 316. Task 310 does not lie flat against wall 212, but instead extends out into the hallway of the task gallery.

dynamically to accommodate the placement of the task so that the task always appears to have a visual link with the floor area below it.

In one embodiment, structural objects such as left side wall object 255, right side wall object 256, floor object 258, and ceiling object 260 may each contain multiple task objects. In addition, task images associated with each task object may be moved along the image associated with the respective wall, ceiling or floor object that contains the task object. Moreover, a task object may be moved between container objects causing the task image to change in response to its new container object.

Movement of Tasks within the Gallery

The tasks and windows of FIG. 6 can be moved by the user. Table 1 below describes the relationship between certain input key strokes and pointing device events to the movement of windows and tasks within a task gallery such as the task gallery of FIG. 6. The particular effects of each input are dependent on the location of the cursor. The first two columns of Table 1 indicate the type of window underneath the cursor and the task in which that window is located. The top row of Table 1 indicates the type of user input provided by the input device. Although specific user inputs have been listed in Table 1, those skilled in the art will recognize that other input devices can be used in place of those chosen and that not all affects shown within a same column for an input instruction are necessarily required to be controlled by the same input instructions. In other words, simply because two events occur in the same column in the embodiment of Table 1 does not necessarily mean that the same events must be generated for the same input instructions used in other embodiments.

TABLE 1

| TASK | WINDOW | LEFT CLICK | SHIFT LEFT CLICK | LEFT DRAG + ALT | DRAG UP | DRAG DOWN | DRAG LEFT | DRAG RIGHT |
| --- | --- | --- | --- | --- | --- | --- | --- | --- |
| NON-TASK | N/A | NO CHANGE | NO CHANGE | STEER CAMERA | NO CHANGE | NO CHANGE | NO CHANGE | NO CHANGE |
| NON-FOCUS TASK | N/A | SWITCH TASKS | NO CHANGE | NO CHANGE | MOVE TASK IN GALLERY | MOVE TASK IN GALLERY | MOVE TASK IN GALLERY | MOVE TASK IN GALLERY |
| FOCUS TASK | FOCUS (CLIENT AREA) | PASS TO APPLIC | PASS TO APPLIC | NO CHANGE | PASS TO APPLIC | PASS TO APPLIC | PASS TO APPLIC | PASS TO APPLIC |
| FOCUS TASK | FOCUS (NON-CLIENT) | NO CHANGE | NO CHANGE | NO CHANGE | NO CHANGE | NO CHANGE | TO ORDERED STACK | NO CHANGE |
| FOCUS TASK | LOOSE STACK | REPLACE IN PREF. VIEW | ADD TO PREF. VIEW | MOVE IN LOOSE STACK | PULL TO FRONT OF LOOSE STACK | PULL TO FRONT OF LOOSE STACK | TO ORDERED STACK | NO CHANGE |
| FOCUS TASK | ORDERED STACK | REPLACE IN PREF. VIEW | ADD TO PREF. VIEW | MOVE IN ORDERED STACK | NO CHANGE | NO CHANGE | NO CHANGE | TO LOOSE STACK |
| FOCUS TASK | NON-FOCUS & PREF. VIEW | SWITCH FOCUS | SWITCH FOCUS | SWITCH FOCUS | NO CHANGE | NO CHANGE | TO ORDERED STACK | NO CHANGE |

Note that the specific appearances of tasks 300, 306, 308, and 310 shown in FIG. 6 are only examples of one embodiment of the present invention. The specific appearance of any one of the tasks can be changed within the scope of the invention. In particular, tasks on side walls 210 and 212 may lie flat against the wall and may not appear with a stand. Under some embodiments, the height of the stand changes In Table 1, there are seven different types of input instructions. The first is the left click instruction in which the left button of a pointing device is clicked by depressing and releasing the button. The second instruction is a shift-left click, in which the shift key of the keyboard is depressed while the left button of the pointing device is clicked. The third input instruction is a left drag plus "alt" key, in which the left button of the pointing device and the "alt" key of the keyboard are depressed while the pointing device is moved. The last four instructions are drag up, drag down, drag left, and drag right. These instructions involve depressing the left button of the pointing device and moving the pointing device up, down, left and right, respectively.

Those skilled in the art will recognize that other input instructions are possible under the present invention. For instance, under one embodiment, a secondary pointing device such as a touch pad is used to provide input. In alternative embodiments, input instructions are indicated by using a combination of keystrokes with the arrow keys on the keyboard.

As shown in Table 1, any task that does not have focus (i.e. any task that is not on stage 217) may be moved by using a traditional drag technique. Thus, by positioning a cursor over the desired non-focus task, and depressing the primary button of the pointing device, the user can move the selected task by moving the pointing device. When the task is in the desired position, the user releases the primary button to "drop" the task in its new location. As discussed further below, some windows in the focus task can also be moved using this technique.

Figure 7:
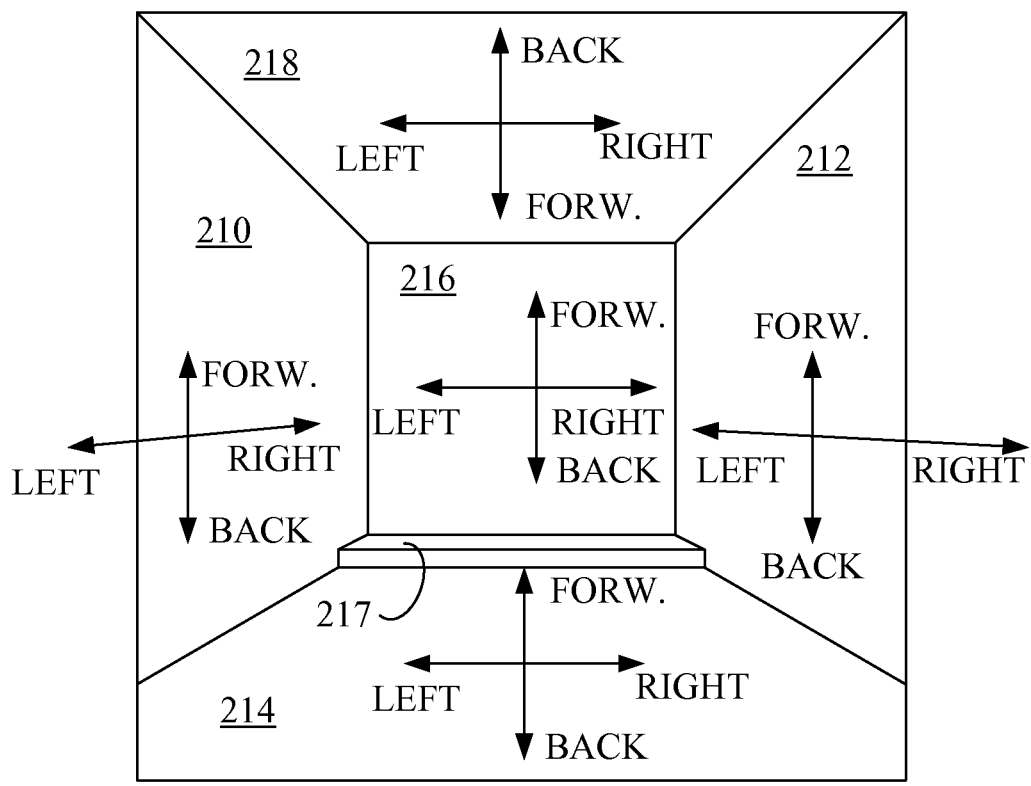
FIG. 7 is a diagram showing the relationship between mouse movement and object movement for objects associated with different parts of the task gallery.

During a drag operation, the direction in which a task moves for a given movement of the pointing device is dependent upon which container object the task is contained within. FIG. 7 describes the relationship between movement of the input pointing device and corresponding movement of a task contained by objects associated with floor 214, ceiling 218, stage 217, and walls 216, 210 and 212. In FIG. 7, the arrows indicate the directions that objects move along the respective structures and the words by the arrows indicate the directions of movement of the pointing device. For walls 216, 210 and 212, movement forward and back with the pointing device results in movement of the selected task or window upward and downward, respectively. For a task on left side wall 210, movement of the input device to the left and right causes the window to move respectively away from and toward end wall 216. For a task on right side wall 212, movement of the input device to the left and right causes the task to move respectively toward and away from end wall 216. In essence, the task currently being moved by the user will appear to stay directly under the cursor.

For a task or window on end wall 216, stage 217, floor 214, and ceiling 218, movement of the input device left and right causes the window or task to move respectively left and right on the display. For tasks on stage 217, floor 214 or ceiling 218, movement of the input device forward and back causes the displayed window to move respectively toward and away from end wall 216. In one embodiment, tasks and windows are restricted from moving freely in all three dimensions of the virtual space but instead are restricted to two-dimensional movement on the surface of a wall, floor or ceiling.

FIGS. 8A and 8B depict the movement of a task 350 along right side wall 212. In FIG. 8A, task 350 is initially shown near the virtual user. The user then selects task 350 by positioning the cursor over task 350 and depressing the primary button of the pointing device. As the user moves the pointing device to the left, task 350 recedes toward stage 217 and is eventually dropped by the user at the location shown in FIG. 8B. Note that because the present invention provides a three-dimensional user interface, as task 350 is moved toward stage 217, it progressively appears smaller.

Figure 11A:
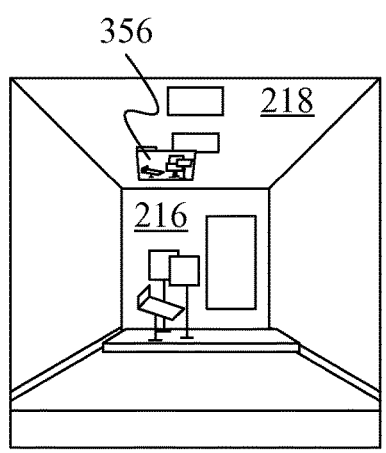
FIGS. 11A-11B show selected frames from the animated movement of a task on the ceiling of the task gallery.
Figure 11B:
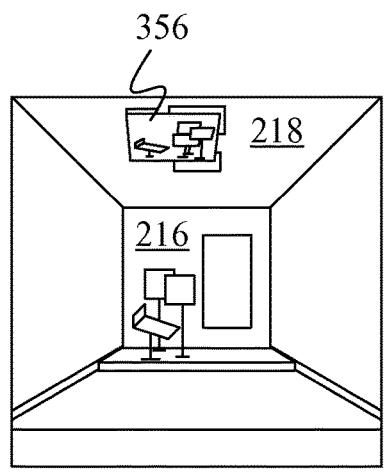

FIGS. 9A and 9B show the movement of a task 352 along left side wall 210. FIGS. 10A and 10B show the movement of a task 354 along floor 214 as task 354 is moved toward the user and away from stage 216. FIGS. 11A and 11B show the movement of a task 356 along ceiling 218 away from stage 216 and toward the user.

Figure 12G:
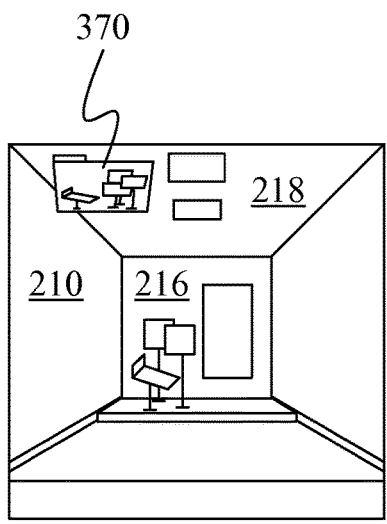

In one embodiment of the invention, tasks may be moved between the side wall, the ceiling and the floor. Such movements are shown in FIGS. 12A through 12I. In FIG. 12A, a task 370 is shown on wall 212. In FIG. 12B, task 370 has been moved to the bottom of wall 212 near floor 214. Continued movement downward along wall 212 eventually causes task 370 to be removed from wall 212 and placed onto floor 214. To avoid the possibility that the task will flip-flop between the floor and the wall during the transition, one embodiment of the present invention includes a hysteresis distance along the floor and the wall. Thus, the mouse must continue to move a certain distance after the task meets the intersection of the floor and the wall before the task is moved to the floor. Likewise, the window will not move from the floor back to the wall until the mouse is moved a small distance to the right of the intersection of the floor and the wall.

In an object oriented embodiment, such as the embodiment of FIG. 5, the movement of task 370 from wall 212 to floor 214 involves moving the task object associated with task 370 from the right side wall container object to the floor container object. As the task object is transferred, it loses the appearance and movement behavior dictated by the right side wall container object and adopts the appearance and movement behavior dictated by the floor container object. Thus, stand 372, which is shown in FIGS. 12A and 12B, disappears in FIG. 12C and the orientation of task 370 is changed so that task 370 leans toward stage 216 instead of extending out into the hallway. In addition, once the task object has been moved to the floor container object, left and right movement of the pointing device no longer moves the task toward and away from stage 216 but instead moves the task left and right across floor 214.

In FIG. 12D, task 370 has been moved across floor 214 so that it is next to left side wall 210. Continued movement in this direction causes the task object associated with task 370 to be transferred from the floor container object to the left side wall container object. This causes the appearance of task 370 to change as shown in FIG. 12E where task 370 is now shown on a stand 374 and is in an upright position along wall 210. In FIG. 12F, task 370 has been moved upward along wall 210 toward ceiling 218. As task 370 is moved upward, stand 374 expands so that it continues to connect task 370 to floor 214.

In FIG. 12G, task 370 has been moved further upward along wall 210 causing the task object associated with task 370 to be removed from the left wall container object and into the ceiling container object. Because of this, the appearance of task 370 has changed by removing the stand found in FIGS. 12E and 12F and leaning the bottom of task 370 toward stage 216. Other embodiments include further changing the appearance of each task to suggest a more realistic relationship between a task and its location in a particular room. For example, a task moved to the ceiling area might have its appearance changed so that it looks like it is hanging from the ceiling. A task placed on the floor might grow legs so that it appeared to provide some semantic consistency with the environment.

Figure 12H:
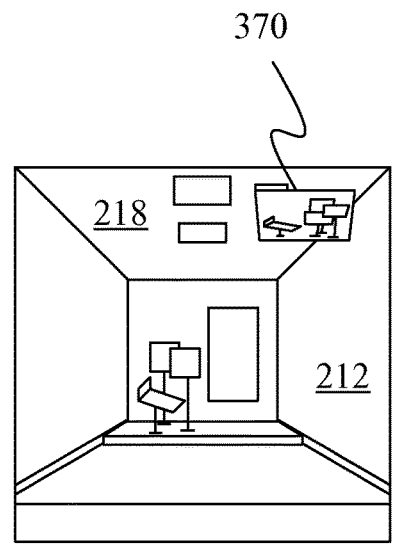

In FIG. 12H, task 370 has been moved to the right across ceiling 218 toward right side wall 212. Continued movement to the right causes the task object associated with task 370 to be removed from the ceiling container object and placed into the right wall container object. This causes a transformation in the appearance of task 370 as shown in FIG. 12I.

Figure 12I:
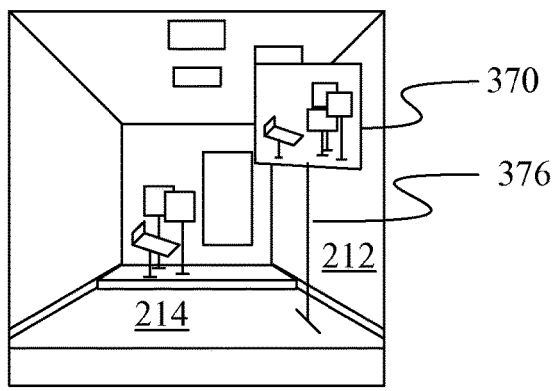

In particular, task 370 is again vertical in FIG. 12I and has a stand 376 that extends from task 370 to floor 214.

Objects on Stage

Returning to the hierarchy of FIG. 5, it can be seen that stage object 254 contains only one task object 268. In the embodiment shown in FIG. 6, when a task object is placed in stage object 254, it becomes the focus task and is associated with an image that does not have a border around the task nor a title bar over the task. (Although in some embodiments, the title of the task can be seen in the backdrop of the focus task.) In addition, instead of being a single image element, a task on the stage consists of multiple window images that can each be manipulated by the user.

The window images of the focus task have associated window objects that are grouped into container objects within task object 268. Specifically, as shown in FIG. 5, task object 268 contains a number of other container objects including a loose stack object 270, an ordered stack object 272, and a primary view object 274. Each of these objects further contains a collection of window objects such as window objects 276 and 278 of loose stack object 270. One of the windows contained by primary view object 274 is a focus window object 280. Focus window object 280 is associated with an application, which receives keyboard and appropriate pointer device input values as long as its associated window object is designated as focus window object 280.

Although multiple window objects are shown in loose stack 270, ordered stack 272 and primary view 274, these containers are not required to always contain a window object. At different times during the practice of the invention, each of these containers may be devoid of window objects.

Examples of window images associated with window objects found in a focus task, such as task 268 of FIG. 5, are shown in FIG. 6. In FIG. 6, window 320 is an image associated with a focus window object contained by a primary view object, windows 322 and 324 are associated with window objects contained by a loose stack object, and windows 326 and 328 are associated with window objects contained by an ordered stack object.

In FIG. 6, window 320 appears closer to the user than loose stack windows 322 and 324 and ordered stack windows 326 and 328. Loose stack windows 322 and 324 each appear on stands, and ordered stack windows 326 and 328 each appear on a podium 330.

Under some embodiments of the invention, various visual cues are added to each window in order to further indicate its state. For example, windows that are not selected, and thus do not allow application interaction, can be shown with a semi-transparent pane over the extent of the window. Additionally an icon in the form of a padlock can be superimposed over the window to indicate its state.

Under one embodiment of the present invention, the user may only interact directly with an application associated with a window if the window is placed in the primary view associated with the stage and the window is given focus. Thus, in order to interact with a window within a task, the user must first place the task at the stage. Under the embodiment of Table 1, this is easily achieved by clicking on the non-focus task that the user wishes to move to the stage. Based on this clicking, the user interface of the present invention provides an animated display showing the removal of the current task from the stage and its replacement by the selected task. Selected frames from such an animation are shown in FIGS. 13A through 13E.

Figure 13A:
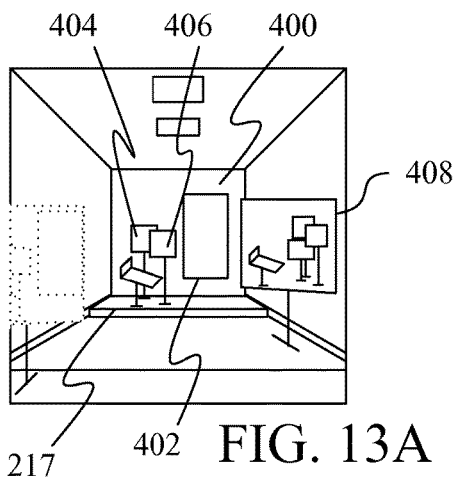
FIGS. 13A-13E show selected frames from the animated movement of tasks when focus is shifted to a new task.

FIG. 13A shows an initial state of the user interface display showing a current task 400 having a primary viewing window 402 and two loose stack windows 404 and 406. The initial display of FIG. 13A also includes a selected task 408, which is the task the user has "clicked" on to move to the stage.

After the user selects task 408, the user interface generates a "snapshot" of current task 400. The snapshot of current task 400 is an image showing the appearance of task 400 from the home viewing area before task 408 was selected.

To produce this snap shot while maintaining the image of the gallery provided to the user, some embodiments of the invention utilize two image buffers. Most often, these embodiments change the typical operation of two image buffers that are already present in most three-dimensional rendering systems. During normal operation, one of these buffers, known as the back buffer, is being filled with image data while the other buffer is being accessed by the display driver to generate the display. The data filling the back buffer represents the appearance of the gallery from the user's next position in the gallery. When the back buffer is full, the two buffers are swapped such that the current display buffer becomes the new back buffer and the current back buffer becomes the new display buffer. The new back buffer is then cleared and filled with new image data representing the user's next position in the gallery.

This normal operation is changed to create the snap shot. When the user selects a new task, the camera's next position is set to the home viewing area. The image of the task gallery is then rendered from that position and the rendered image data is stored in the back buffer. Without swapping the two buffers, the data in the back buffer is read out into a separate memory location that holds the snap shot. The back buffer is then cleared and the position of the camera is reset to its previous position. Normal operation of the buffers is then restored. During this operation, the display buffer is accessed to produce the display, so the user is unaware of the temporary change in the camera position.

Figure 13B:
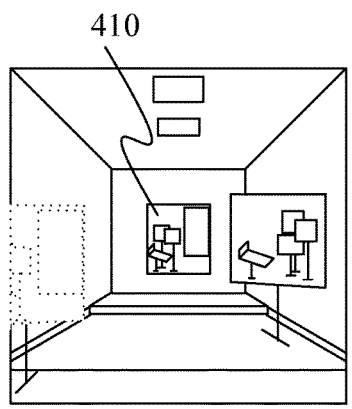

Once generated, the snapshot is displayed on a stand as shown in FIG. 13B where a task image 410 has been generated over the stage. After task image 410 has been generated, task image 410 begins to move away from the stage. In one embodiment, task image 410 moves toward its last location in the task gallery before it was selected to move to stage 217. In some embodiments, this last location is marked by a stand, such as stand 412, that supports a "dimmed" or "faded" image of the task as it appeared before it was moved to the stage. In other embodiments, the location is not visibly marked on the display.

Figure 13C:
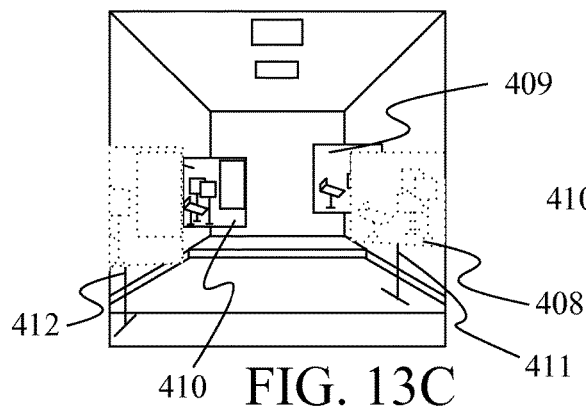

At the same time, task image 409 of selected task 408 begins to move toward stage 217 while stand 411 of selected task 408 and a faded version of task image 409 remain in place along the right side wall. FIG. 13C shows one frame of the display during the animated movement of both task image 410 and selected task 408.

In some embodiments, various visual cues are placed around the border of the selected task to indicate that it is selected. These can include a border, brighter background image, or additional textual cues.

As task image 410 moves from the stage, its associated task object is removed from the stage container object and is placed in the left side wall container object. In one embodiment, this occurs as soon as task image 410 moves far enough left in the animation to be considered moving along the left side wall.

Figure 13D:
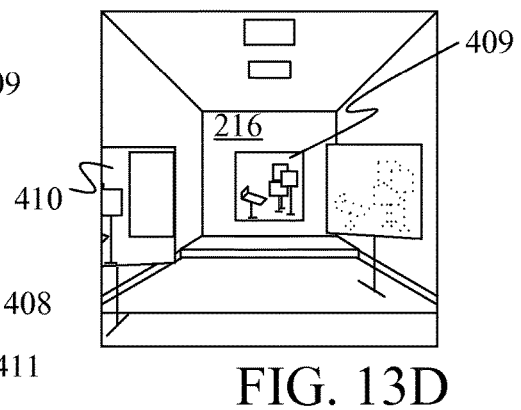
Figure 13E:
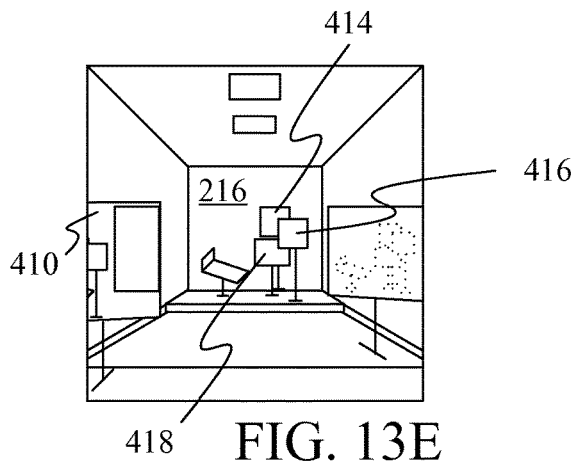

In FIG. 13D, task image 410 has returned to its previous position in the task gallery and selected task image 409 is positioned over stage 217. When task image 409 reaches stage 217, the task object associated with task image 409 is removed from the side wall container it had been in and is placed in the stage container. When task image 409 is placed in the stage container, under one embodiment, a background image that is shown behind the windows in task image 409 is expanded to fill all of end wall 216. The windows within task image 409 are then redrawn using current data from the windows' associated applications. In FIG. 13E, this means that windows 414, 416 and 418 of selected task 408 are redrawn with the size and location of the windows determined by values stored for those windows when selected task 408 was last moved from stage 217 to the task gallery.

Switching Tasks Using a Menu

Figure 14A:
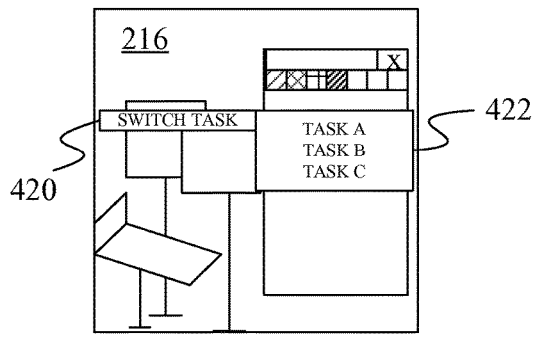
FIGS. 14A-14F show selected frames from the animated movement of the virtual user and tasks when focus is shifted to a new task using a menu selection.

In many embodiments of the invention, users may also switch between tasks using a pop-up menu. Such a technique is shown in FIGS. 14A through 14F. In FIG. 14A, the user has invoked a pop-up window 420 that provides a "switch task" command. Although only the "switch task" command is shown in FIG. 14A, those skilled in the art will recognize that other commands can also be present above and/or below the "switch task" command. A secondary pop-up window 422 that provides a list of tasks available in the task gallery is shown displayed to the right of pop-up window 420. The user may select one of the available tasks by manipulating an input device such as the keyboard or mouse. Note that in FIG. 14A, the virtual user is in the home viewing area, which is centered in front of stage 217 and end wall 216.

Figure 14B:
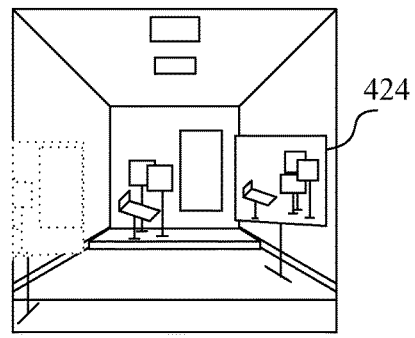

After the user has selected a task from secondary pop-up window 422, the user interface generates an animation that gives the appearance that the user is moving backward through the task gallery. This movement continues until the user is far enough back that the selected task and the dimmed version of the former current task are fully in view. In FIG. 14B, the task selected by the user is shown as selected task 424. Although not necessary to the practice of the present invention, this automatic movement allows the user to see an animated switch of the tasks so that the user has a better understanding of which task has actually been selected. In one embodiment, the automatic movement of the user can be over-ridden by the user through a user preference.

Figure 14C:
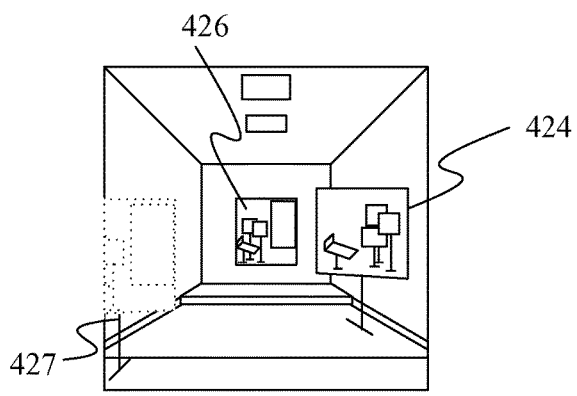
Figure 14D:
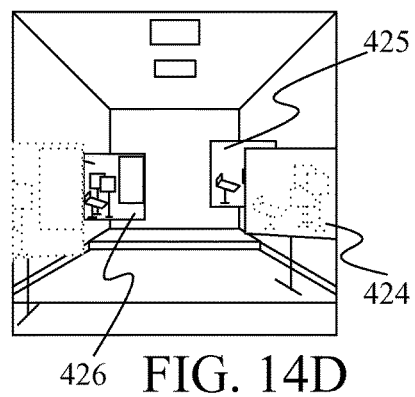

In FIG. 14C, the user interface generates a "snapshot" of the current task and produces task image 426 from that "snapshot". Task image 426 then begins to move toward a stand 427 at its previous location in the task gallery. At the same time, task image 425 of selected task 424 begins to move toward stage 217. FIG. 14D shows one frame during the middle of this animated motion.

As task image 426 moves, its associated object is removed from the stage container object and is placed in the left side wall container object.

Figure 14E:
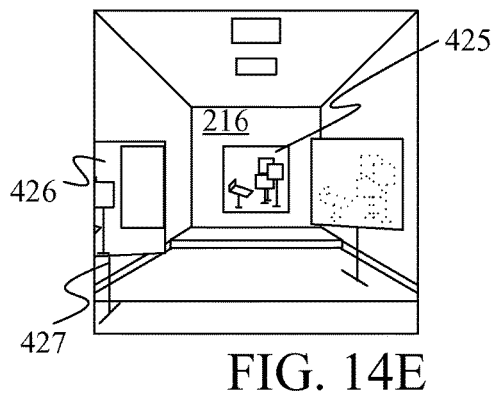
Figure 14F:
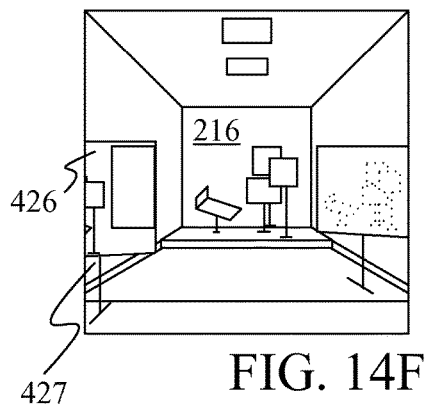

When task image 426 has returned to its original location and selected task 424 has moved to stage 217, as shown in FIG. 14E, the object associated with selected task 424 is removed from the right side wall container object and is placed into the stage container object. The display then regenerates each window in selected task 424 above stage 217. In some embodiments, the virtual user is then returned to the home viewing area.

Virtual User Movement

In the embodiment of the present invention associated with the input controls of Table 1, the user may move through the task gallery using a pointing device to indicate the direction and duration of each movement. Alternatively or in addition to the direct movement, the user may initiate movements to fixed positions within the task gallery. To facilitate such movement, the task gallery is divided into rooms with one or more user positions within each room. By using a single key stroke, the user may advance forward one room or backward one room. In addition, by using a dedicated key or dedicated combination of keys, the user may move directly from any location within the task gallery to the home viewing area in front of stage 217.

These embodiments of the invention provide a high level of control where a single click on an appropriate navigational control (button), causes the virtual user to move swiftly but smoothly from their current location to a new desired location. In other words, a discrete action results in transportation of the virtual user to commonly used and useful locations. This avoids problems of hand-eye coordination and the need for well-developed spatialization skills.

Figure 15A:
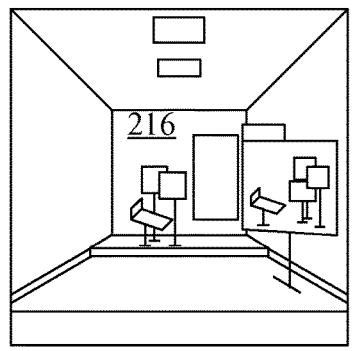
FIGS. 15A-15D show selected frames from the animated movement of a virtual user to the home viewing area.
Figure 15B:
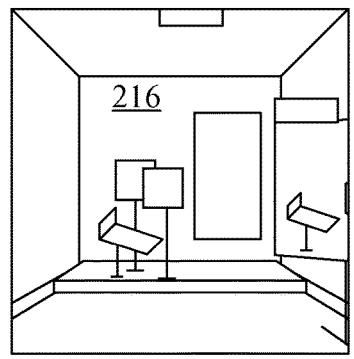
Figure 15C:
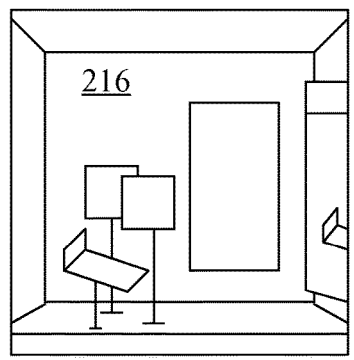
Figure 15D:
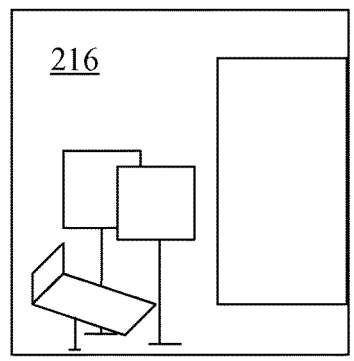

FIGS. 15A through 15D show an animated motion from a remote location in the task gallery to the home viewing area. Specifically, in FIG. 15A, the user is located in the second room of the task gallery. The user then initiates the command to move to the home viewing area. FIGS. 15B and 15C show selected frames in the animated movement towards stage 217 and FIG. 15D shows the view from the home viewing area.

Figure 16:
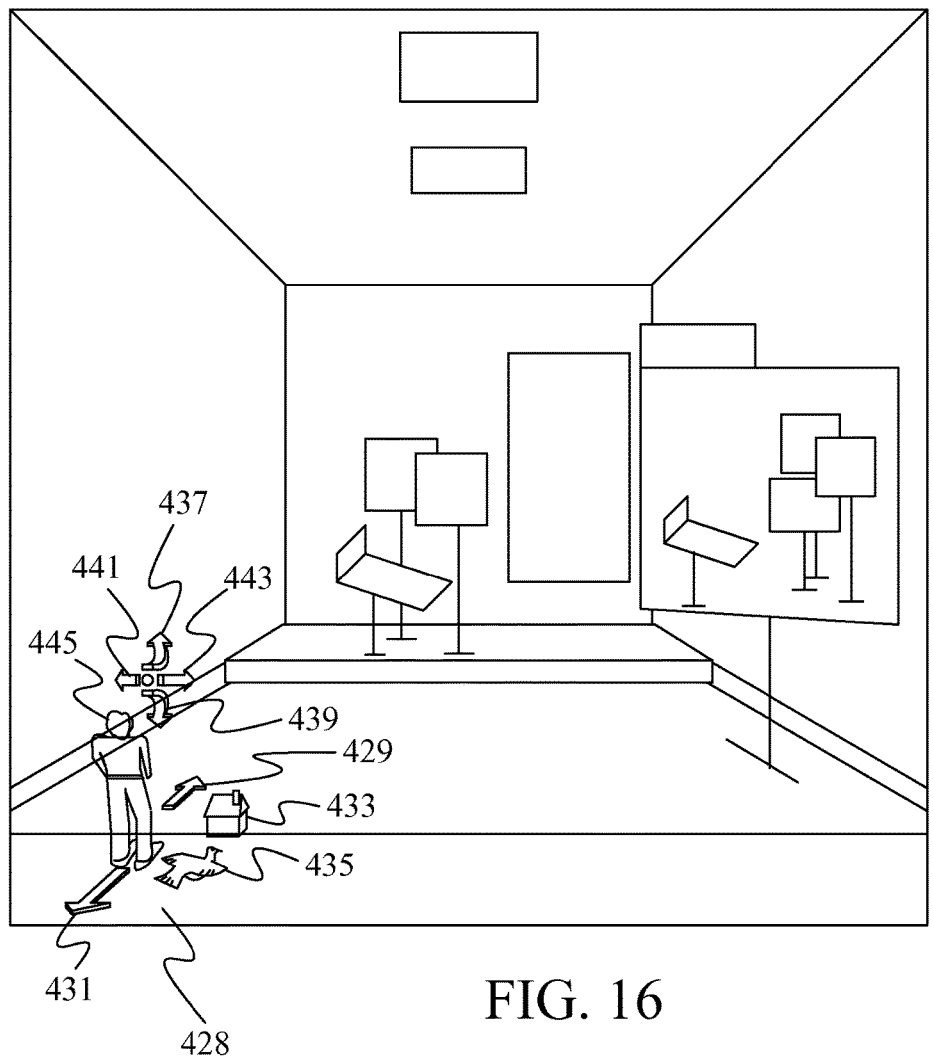
FIG. 16 shows a movement control in a task gallery of one embodiment of the invention.

FIG. 16 shows another embodiment of the present invention in which a set of movement controls 428 are displayed in the lower left corner of the three-dimensional environment. The movement controls include a forward arrow control 429, a backward arrow control 431, a home viewing area control 433, an overview control 435, an up glance control 437, a down glance control 439, a left glance control 441, a right glance control 443 and a human FIG. 445. Although the appearance of the buttons and icons in FIG. 16 are found in several embodiments of the invention, different designs for the appearance of the buttons and icons can be used depending on the intended experience level of the user.

By placing the cursor over a control and depressing a button on the mouse or keyboard, a user can select the control and cause the user to move through the environment or change the direction of their view of the environment. For instance, selecting forward arrow control 429 causes the user to move forward one room in the environment and selecting backward arrow control 431 causes the user to move backward one room. Selecting home viewing area control 433 causes the user to move to the home viewing area. Selecting overview control 435 causes the user to move to the back of the task gallery so that the entire task gallery is visible. Selecting glancing controls 437, 439, 441, and 443 is discussed below in connection with glances.

Under one embodiment of the present invention, movement controls 428 are always present on the screen. In other embodiments, movement controls 428 are only displayed when the user requests that they be displayed. For example, a touch-sensitive input device can be used to fade in or fade out the human figure. When the user touches the input device, the figure appears, and when the user lets go it vanishes. In still other embodiments, the human figure is always present on the screen but the movement controls only appear when the user places the cursor over the figure. In further embodiments of the invention, pausing the cursor over one of the controls or the human figure generates a tool-tip that describes the function of the control.

Further embodiments of the invention rely on input devices that are optimized for the task of navigation. These include dedicated keys on the keyboard, touch-sensitive pads for direction control, and/or small spring-loaded levers with sensors to control the primary locomotion interactions.

The Focus Task

Figure 17:
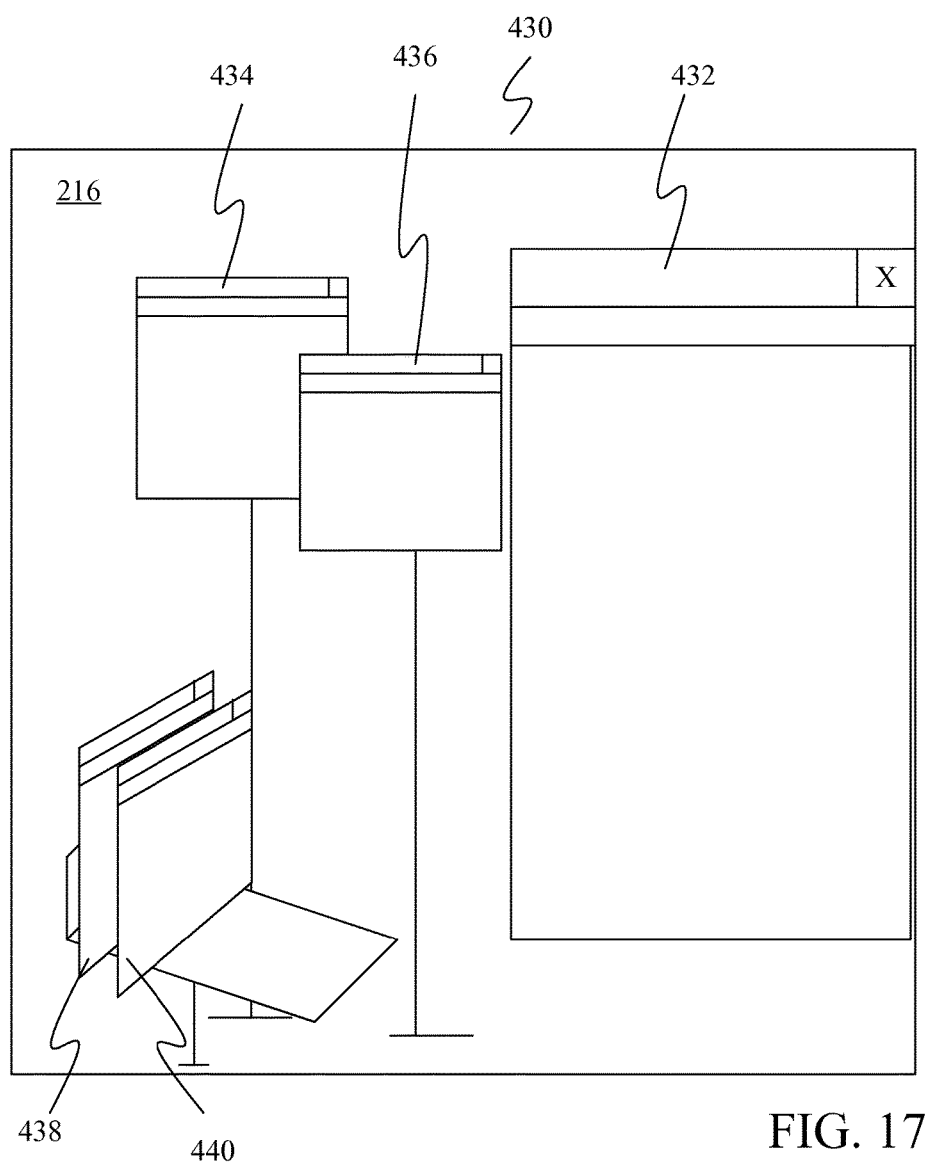
FIG. 17 shows a focus task from the perspective of the home viewing area.

FIG. 17 shows a screen display produced when the user is in the home viewing area in front of stage 217. In FIG. 17, a task 430 is shown that contains a focus window 432 in the primary viewing area, windows 434 and 436 in a loose stack area and windows 438 and 440 in an ordered stack area. Although the screen display of FIG. 17 is described in connection with a virtual user placed in a three-dimensional task gallery, the inventive aspects of the screen display discussed below are not limited to such an environment. As such, the inventive aspects of the screen display of FIG. 17 discussed further below may be practiced in an environment that does not include a three-dimensional task gallery such as a simple three-dimensional desktop.

Moving Windows from the Primary View to the Loose Stack

Figure 18A:
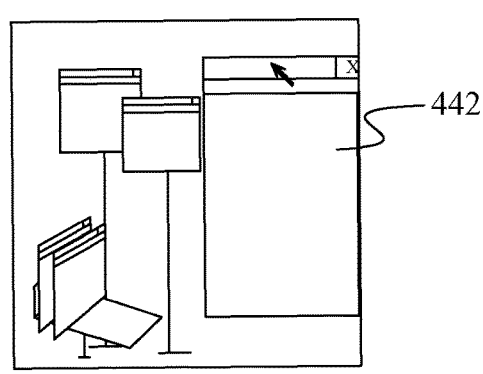
FIGS. 18A-18D show selected frames from the animated movement of a window from the primary viewing location to the loose stack.

Within the current or focus task, the user may move windows between the primary viewing area, the loose stack, and the ordered stack. FIGS. 18A through 18D show selected frames representing the movement of a window from the primary viewing area to the loose stack. In FIG. 18A, the user has placed the cursor over window 442, which is located in the primary viewing area. Note that window 442 has focus in FIG. 18A, and as such, most keyboard and pointing device inputs are provided directly to the application corresponding to the focus window. In order to overcome this default, a combination of keystrokes may be used as the command to move the window from the primary viewing area to the loose stack. For example, in the embodiment associated with Table 1, the user performs a drag up on the window in the primary viewing area while depressing the "alt" key in order to move it to the loose stack. Alternatively, the command for moving a window to the loose stack from the primary viewing area can require that the cursor be positioned in a non-client area (also known as a window decoration area) in order for the command input to be directed away from the application and to the user interface.

Figure 18B:
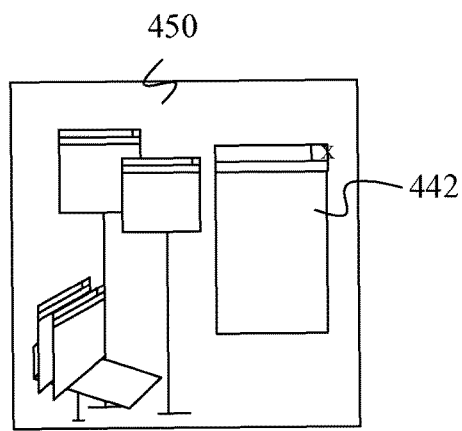
Figure 18C:
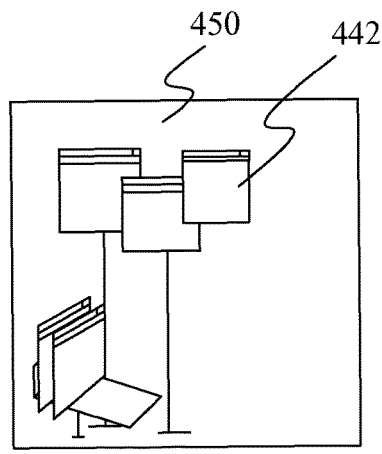
Figure 18D:
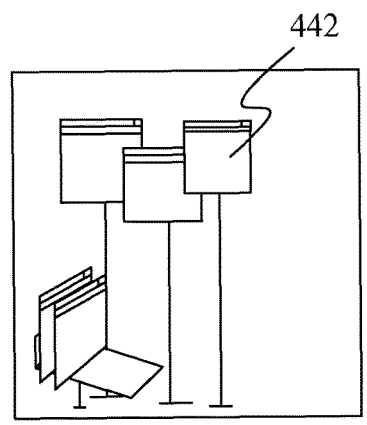

Upon receiving the input corresponding to the user's desire to move window 442 to the loose stack, the user interface begins to push window 442 back toward a loose stack area 450 as shown in FIG. 18B. When window 442 reaches loose stack area 450, as shown in FIG. 18C, the window object associated with window 442 is removed from the primary viewing container and placed into the loose stack container. Since windows in the loose stack have stands that connect the windows to the floor, a stand is then drawn below window 442 as shown in FIG. 18D.

Moving Windows from the Ordered Stack to the Loose Stack

Figure 19A:
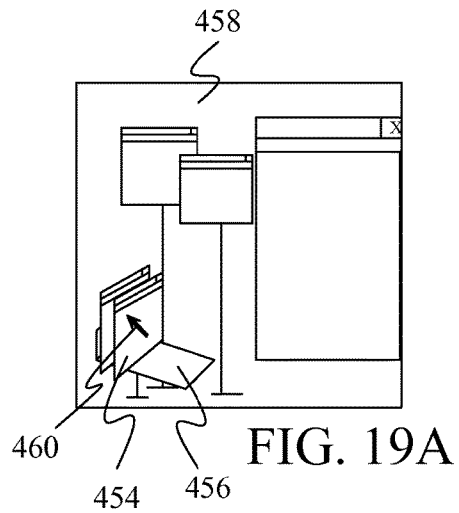
FIGS. 19A-19C show selected frames from the animated movement of a window from the ordered stack to the loose stack.
Figure 19B:
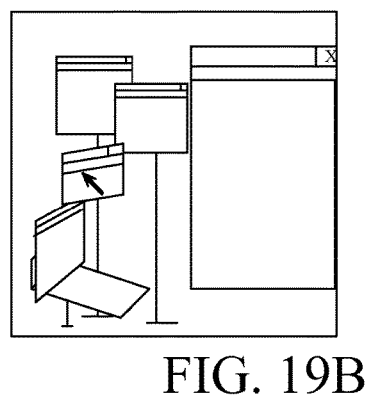
Figure 19C:
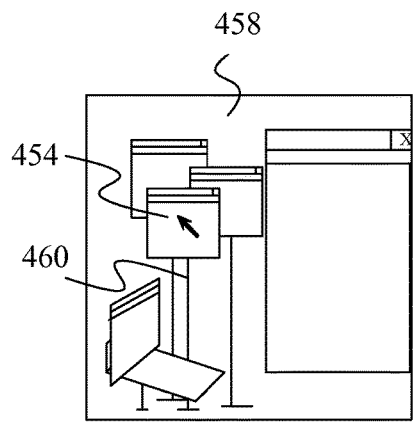

FIGS. 19A through 19C show selected frames of an animation produced by an embodiment of the present invention to show the movement of a window 454 from an ordered stack 456 to a loose stack 458. In FIG. 19A, the user has positioned a cursor 460 over window 454. With the cursor positioned over window 454, the user provides input corresponding to a desire to move window 454 to loose stack 458. In the embodiment of Table 1 this input is a drag to the right. In other embodiments, any dragging operation from the ordered stack toward the loose stack will be interpreted as a command to move the selected window from the ordered stack to the loose stack.

When the user interface receives the drag right input, it generates an animated movement of the selected window 454 that shows window 454 moving up from the ordered stack 456 toward loose stack 458. In addition, the animation shows the rotation of window 454 so that the window's orientation matches the orientation of the loose stack windows. FIG. 19B shows a frame of this animated movement.

In FIG. 19C, window 454 is positioned within loose stack 458. At this point, the object associated with window 454 has been removed from the ordered stack container and has been placed in the loose stack container. As such, window 454 is drawn in the display with a stand 460 extending from the bottom of window 454 to the floor. In addition, if the window removed from the ordered stack was not the front window, an animation is invoked to re-position the windows in the ordered stack so that they are a fixed distance apart from each other.

Movement of a Window from the Ordered Stack to the Primary Viewing Area

Figure 20A:
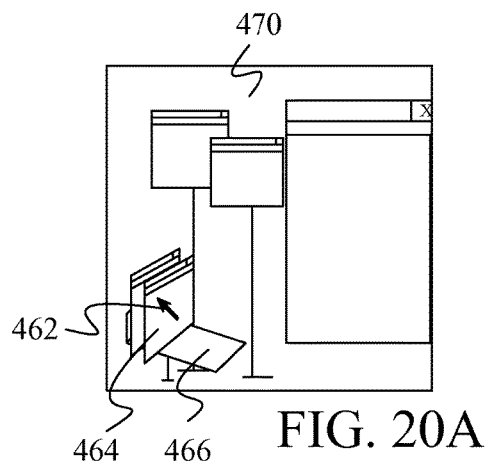
FIGS. 20A-20C show selected frames from the animated movement of a window from the ordered stack to the primary viewing location in place of an existing window in the primary viewing location.
Figure 20B:
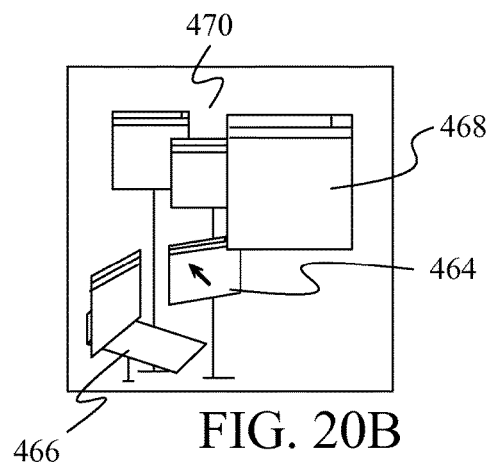
Figure 20C:
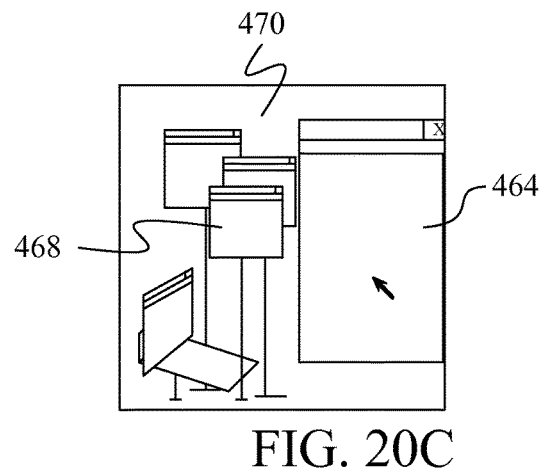

FIGS. 20A through 20C show separate frames of an animation created by the present user interface when the user wishes to replace the window in the primary viewing area with a window on the ordered stack. In FIG. 20A, the user has positioned a cursor 462 over a window 464 in an ordered stack 466. With the cursor in this position, the user indicates their desire to replace window 468 of the primary viewing area with window 464. In the embodiment of Table 1, the user indicates their desire for this change by clicking a primary button of a pointing device such as a mouse or a track ball.

Upon receiving the "click" input, the user interface simultaneously moves window 464 up toward the primary viewing area and pushes window 468 back toward either loose stack 470 or ordered stack 466. In one embodiment, window 468 is pushed back toward the stack that the window was in before it was moved to the primary viewing area. When window 464 reaches the primary viewing area and window 468 reaches loose stack 470, the object's associated with these windows are moved into the appropriate container objects. For example, window 464 is moved from the ordered stack container object into the primary viewing area container object. In addition, window 464 is identified as the focus window.

Lastly, if the window removed from the ordered stack was not the front window, an animation is invoked to re-position the windows in the ordered stack so that they are a fixed distance apart from each other.

Moving a Window from the Loose Stack to the Ordered Stack

Figure 21A:
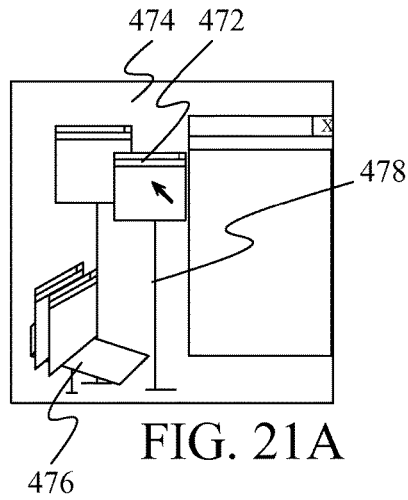
FIGS. 21A-21C show selected frames from the animated movement of a window from the loose stack to the ordered stack.
Figure 21B:
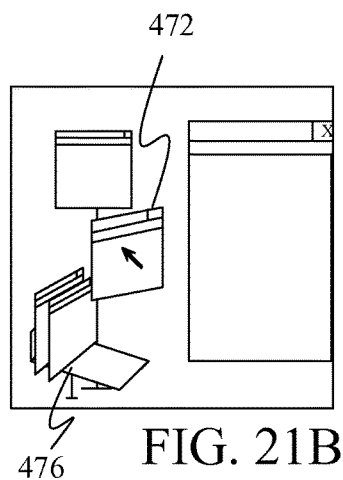
Figure 21C:
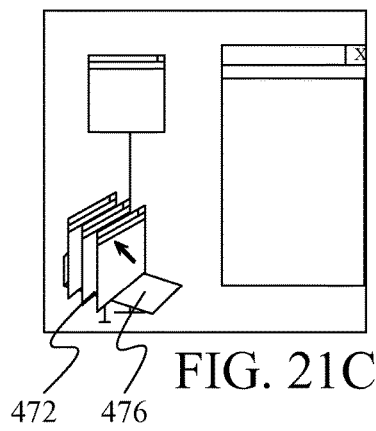

FIGS. 21A through 21C show frames from an animation generated when the user indicates that they want to move a window 472 from a loose stack 474 to an ordered stack 476. In one embodiment, the user indicates that they wish to move a window from the loose stack to the ordered stack by placing a cursor over the window and performing a drag left. In other embodiments, any dragging operation from the loose stack to the vicinity of the ordered stack will be interpreted as a command to move the selected window from the loose stack to the ordered stack.

After receiving the drag left input, the user interface generates an animation in which window 472 is brought forward toward ordered stack 476 and is rotated so that it is aligned with the other windows in ordered stack 476. FIG. 21B shows one frame of that animated movement. Before moving window 472, stand 478 of FIG. 21A is removed from the bottom of window 472. When window 472 reaches ordered stack 476, the object associated with window 472 is removed from the loose stack container object and is placed in the ordered stack container object.

Moving a Window from the Loose Stack to the Primary Viewing Area

Figure 22A:
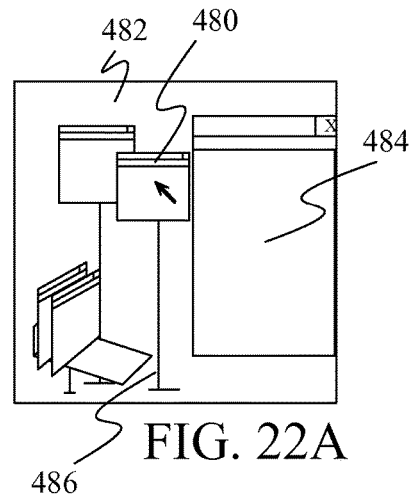
FIGS. 22A-22C show selected frames from the animated movement of a window from the loose stack to the primary viewing location in place of an existing window in the primary viewing location.
Figure 22B:
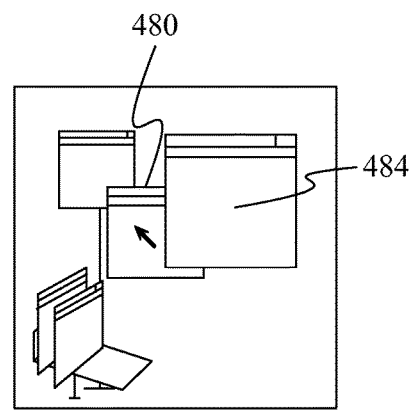
Figure 22C:
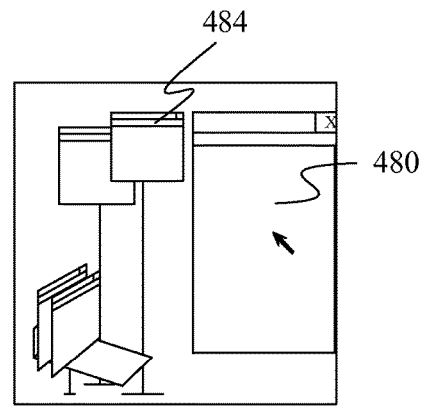

FIGS. 22A through 22C show selected frames from an animation generated by the present interface when the user wishes to replace a window 484 in the primary viewing area with a window 480 from a loose stack 482. In the embodiment of Table 1, the user initiates this movement by clicking on window 480. Based on this input, the user interface generates an animation in which window 480 is brought forward from loose stack 482 to the primary viewing area and window 484, which is in the primary viewing area, is moved back to either the loose stack or the ordered stack depending on where it was before being placed in the primary viewing area. For the purposes of FIGS. 22A through 22C, window 484 was in loose stack 482 before being moved to the primary viewing area.

During the animation, the object associated with window 480 is removed from the loose stack container object. This causes stand 486 to disappear so that window 480 appears unsupported. At the same time, the object associated with window 484 is removed from the primary viewing container and placed into the loose stack container. When the object associated with window 484 is placed in the loose stack container object, a stand appears below window 484.

Moving Windows from the Primary Viewing Area to the Ordered Stack

Figure 23A:
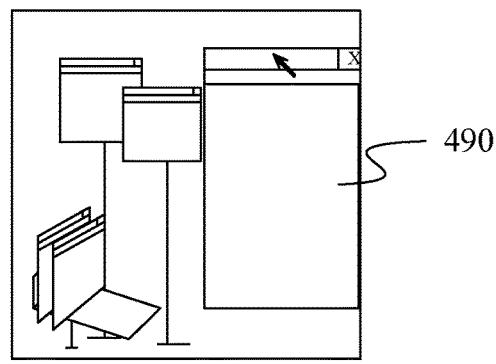
FIGS. 23A-23C show selected frames from the animated movement of a window from the primary viewing location to the ordered stack.
Figure 23B:
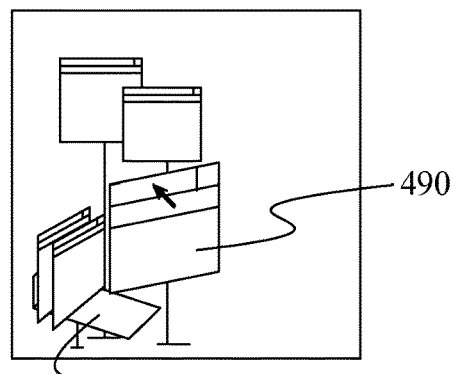
Figure 23C:
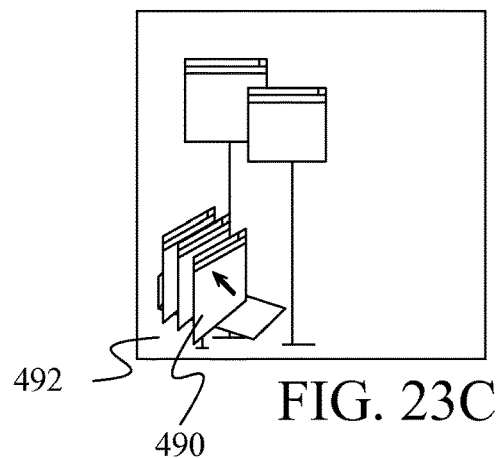

FIGS. 23A through 23C show selected frames from an animation created by an embodiment of the present user interface when the user indicates that they wish to move a window 490 from the primary viewing area to ordered stack 492. In one embodiment, the user indicates that they want to move window 490 to ordered stack 492 by performing a drag left while the "alt" key is depressed and the cursor is positioned over window 490.

Under this embodiment, when the user interface receives a drag left and "alt" key input while the cursor is positioned over window 490, the user interface initiates an animation in which window 490 is pushed backward and rotated slightly to align itself with ordered stack 492 as shown in FIG. 23B. When window 490 reaches ordered stack 492, the object associated with window 490 is placed in the ordered stack container object and is removed from the primary viewing area object. The end result of this animation is shown in the frame of FIG. 23C.

Moving Objects within the Loose Stack

Figure 24A:
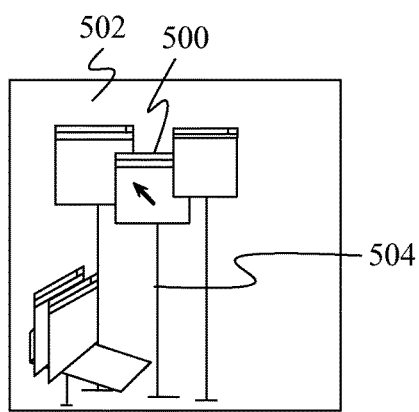
FIGS. 24A-24C show selected frames from the dragging of a window within the loose stack.
Figure 24B:
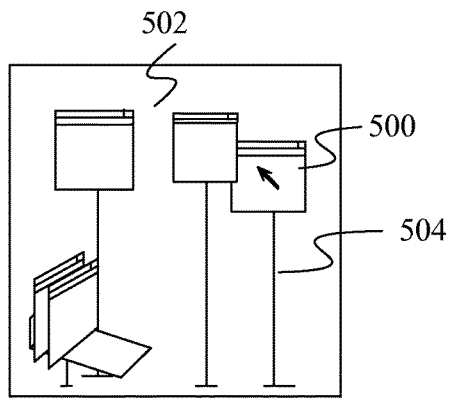
Figure 24C:
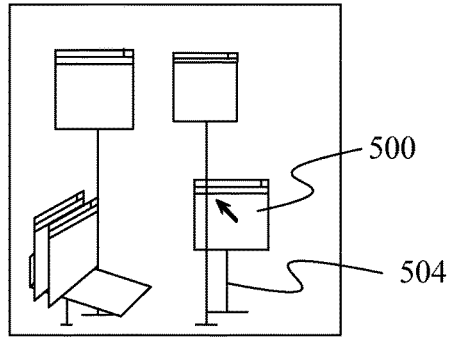

Windows within the loose stack inherit movement properties from the loose stack container object that allow the user to reposition the windows freely within the loose stack. In one embodiment, there are two types of possible movement for a window within the loose stack. First, the window may be moved laterally or vertically within the loose stack as shown in FIGS. 24A through 24C where window 500 in loose stack 502 is moved by the user from an initial position shown in FIG. 24A to a second position shown in FIG. 24B and finally to a third position as shown in FIG. 24C. In the movement from the initial position of FIG. 24A to the second position of FIG. 24B, the user mostly moves the window laterally to the right. In the second motion, from the second position of FIG. 24B to the third position of 24C, the user moves window 500 downward and to the left. Note that as window 500 is moved, a stand 504 located below window 500 is adjusted so that it remains below window 500 and has the appropriate size to connect window 500 to the floor.

In the embodiment of Table 1, the movement shown in FIGS. 24A through 24C is accomplished by the user by placing the cursor over window 500 and performing a drag operation with the "alt" key depressed.

Figure 25A:
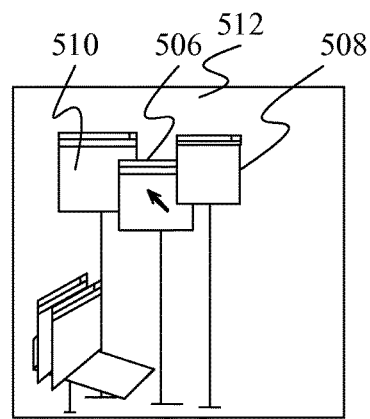
FIGS. 25A-25C show selected frames from the animated movement of a window within the loose stack.
Figure 25B:
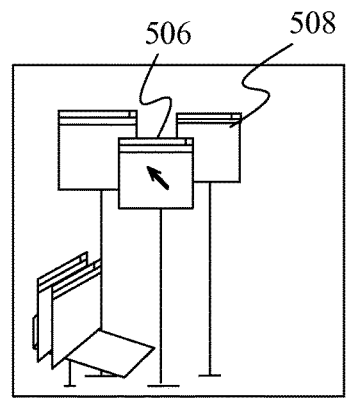
Figure 25C:
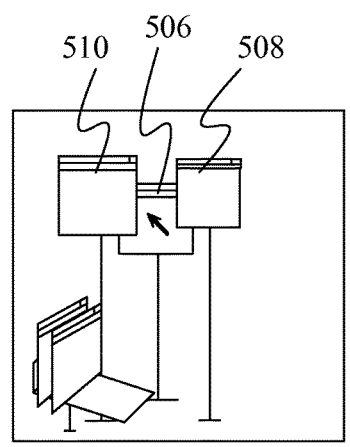

Windows within the loose stack may also be moved forward and backward within the loose stack. FIGS. 25A through 25C show the movement of a loose stack window 506 first to the front of the loose stack and then to the back of the loose stack. Thus, in FIG. 25A, window 506 is shown initially positioned between windows 508 and 510 of loose stack 512. In FIG. 25B, window 506 has been brought to the front of loose stack 512 and is now in front of window 508. In FIG. 25C, window 506 has been placed at the back of the loose stack behind both window 510 and window 508.

In the embodiment of Table 1, the user indicates that they wish to pull a loose stack window to the front of the loose stack by performing a drag down. To push a window back in the loose stack, the user performs a drag up operation.

Movement within the Ordered Stack

Under the present invention, a user can also reorganize the order of windows in an ordered stack. Although the user can change the order of the windows, the precise locations of the windows are determined by the user interface.

Figure 26A:
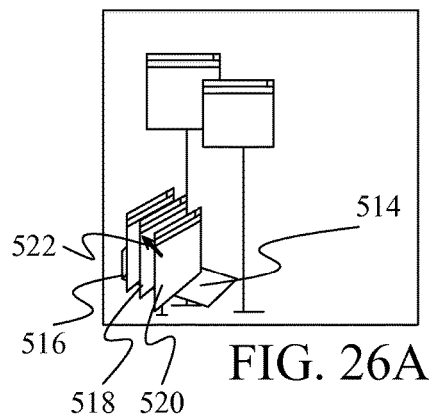
FIGS. 26A-26F show selected frames from the dragging and animated movement of a window within the ordered stack.
Figure 26B:
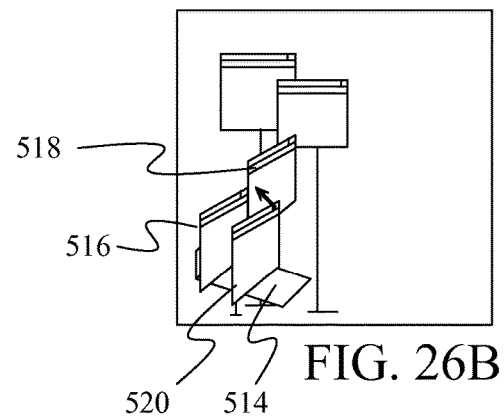
Figure 26C:
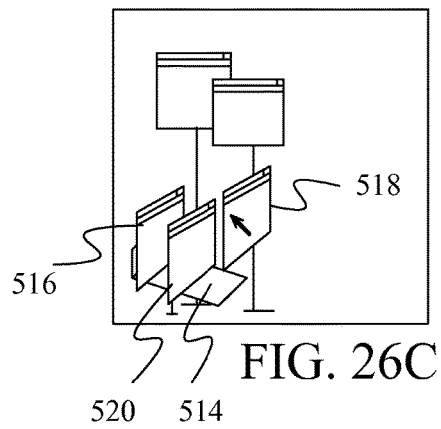

For example, in FIGS. 26A through 26F, the user reorders an ordered stack 514 that contains windows 516, 518 and 520. In the initial display shown in FIG. 26A, window 518 is shown between windows 516 and 520 in ordered stack 514. By selecting window 516, the user is able to drag window 516 upward as shown in FIG. 26B and forward of window 520 as shown in FIG. 26C.

Figure 26D:
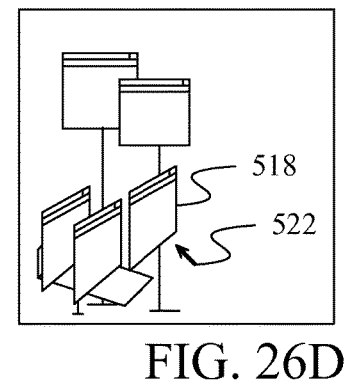
Figure 26E:
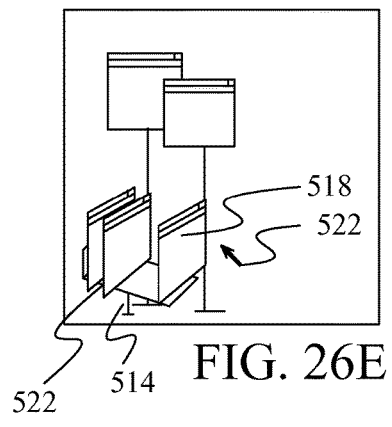

Since the user interface automatically repositions windows in the ordered stack, the user may release window 518 outside of the ordered stack as shown in FIG. 26D, where cursor 522 has been moved from window 518 after the user has released the primary button of the pointing device.

Figure 26F:
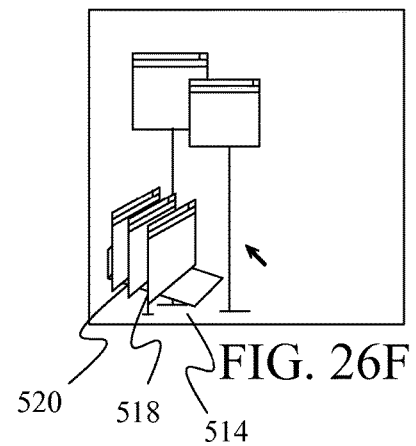

When the user releases window 518, windows 518 and 520 begin to move. Specifically, window 520 moves backward in ordered stack 514 to assume the position that window 518 originally had in ordered stack 514. At the same time, window 518 moves downward and back toward ordered stack 514. When the movement is complete, window 518 occupies the space that window 520 occupied initially in FIG. 26A. Its final resting position is shown in FIG. 26F. Thus, the user is able to reorganize ordered stack 514 without having to expend unnecessary energy in realigning the windows within ordered stack 514.

Movement Using Icon Control

Figure 27:
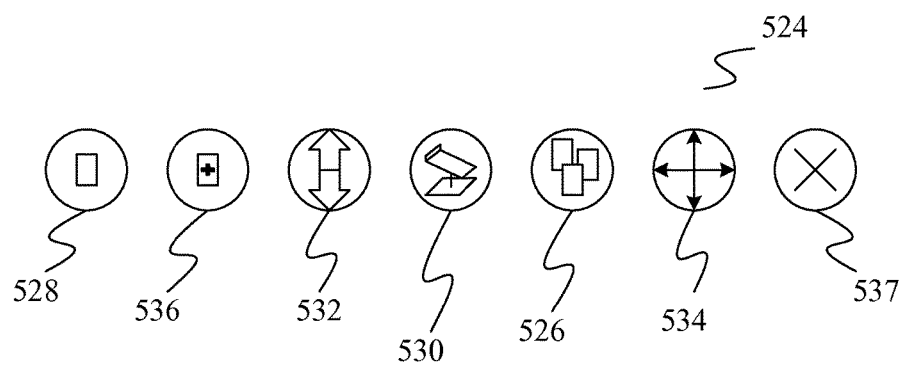
FIG. 27 shows a set of iconic buttons for controlling movement of windows in an embodiment of the present invention.

Under an alternative embodiment, windows in the primary task may also be moved by using a set of selectable button icons such as buttons 524 of FIG. 27. In one embodiment, buttons 524 appear on top of a window when a cursor crosses into the window. The buttons persist above the window so that the user may reposition the cursor over one of the buttons. By clicking on one of the buttons, or by dragging one of the buttons, the user is then able to move the selected window in any of the manners described above.

Figure 28A:
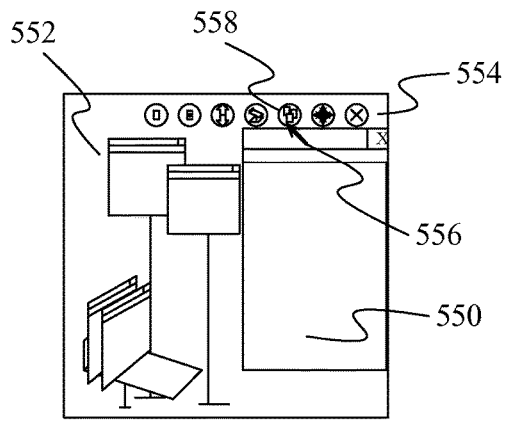
FIGS. 28A-28D show selected frames from the animated movement of a window from the primary viewing location to the loose stack using button icons.
Figure 28B:
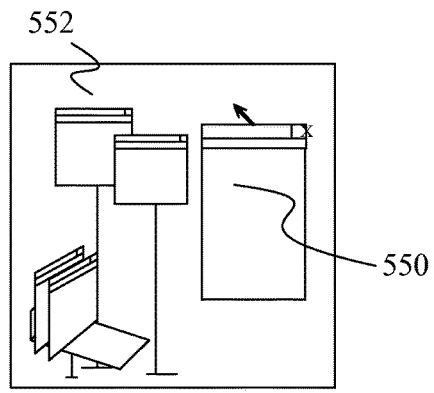
Figure 28C:
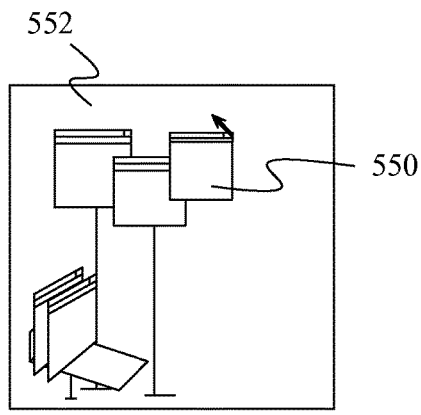
Figure 28D:
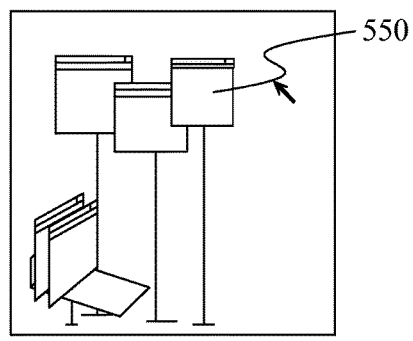

For example, a user can move a window in the primary viewing area to the loose stack by clicking loose stack button 526 of buttons 524. FIGS. 28A through 28D show selected frames of an animation created by an embodiment of the present invention showing the movement of a window 550 from a primary viewing area to a loose stack 552 using a set of buttons 554. In FIG. 28A, button icons 554 have been generated by the user interface above window 550 based on the location of a cursor 556 within the window 550. The user has moved the cursor 556 over to "loose-stack" button 554 and has clicked on that button. In FIG. 28B, window 550 has been pushed backward toward loose stack 552. In FIG. 28C, window 550 has reached loose stack 552 and in FIG. 28D a stand has appeared below window 550.

Figure 29A:
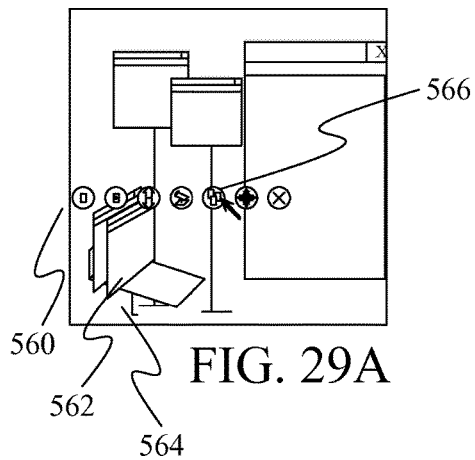
FIGS. 29A-29C show selected frames from the animated movement of a window from the ordered stack to the loose stack using button icons.
Figure 29B:
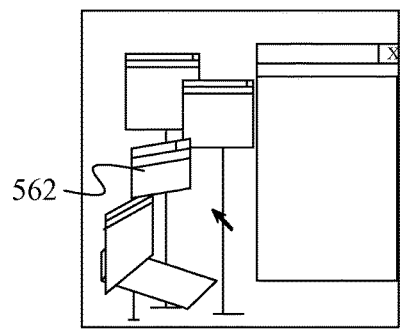
Figure 29C:
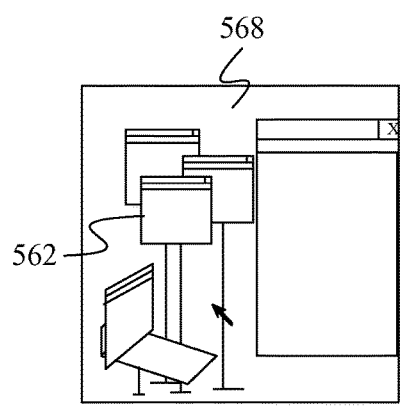

Loose stack button 526 may also be used to move a window from an ordered stack to the loose stack as shown in FIGS. 29A through 29C. In FIG. 29A, the user has caused button icons 560 to appear above window 562 in ordered stack 564 by placing the cursor in window 562. The user has then positioned the cursor over loose stack button 566 of button icons 560. By clicking on loose button 566, the user initiates an animation in which window 562 moves to loose stack 568. FIG. 29B shows one frame during that animated motion and FIG. 29C shows window 562 in its final position in loose stack 568.

Figure 30A:
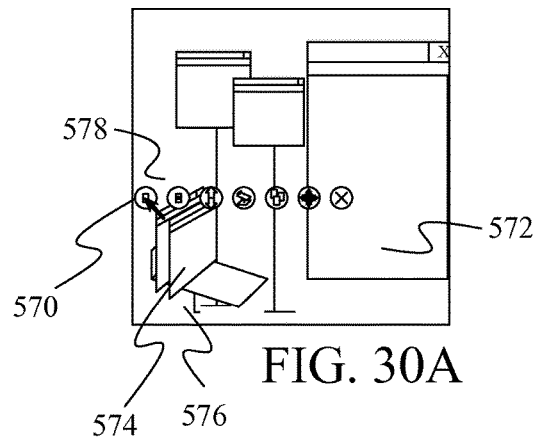
FIGS. 30A-30C show selected frames from the animated movement of a window from the ordered stack to the primary viewing location in place of an existing window in the primary viewing location using button icons.
Figure 30B:
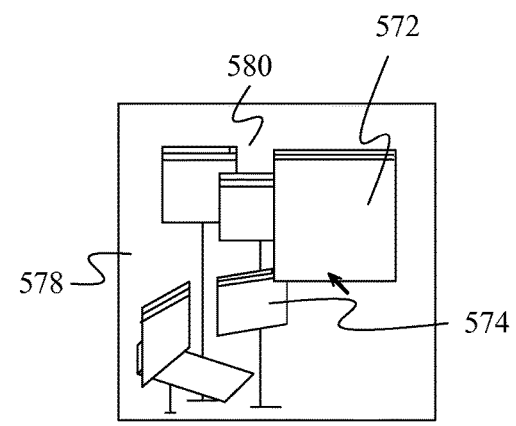
Figure 30C:
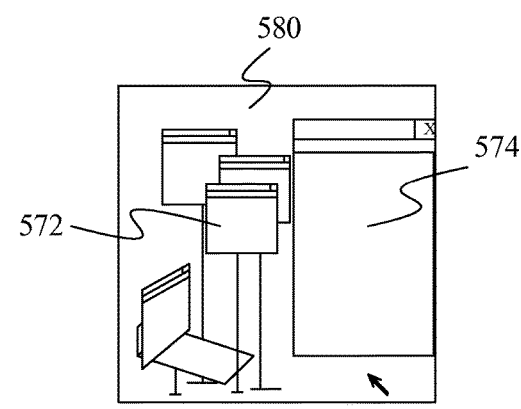

Button icons 524 of FIG. 27 also include a primary view button 528, which is used to replace the current window in the primary view with a selected window. FIGS. 30A through 30C show the use of a primary view button 570 to replace a window 572 in the primary view with a window 574 from an ordered stack 576. In FIG. 30A, button icons 578 have been generated when the user moved the cursor over window 574. The user has then moved the cursor over the primary view button 570. When the user clicks on primary view button 570, window 572 in the primary viewing area begins to move back toward loose stack 580 while window 574 moves forward. At the end of the movement, window 572 is located in loose stack 580 and window 574 is located in the primary viewing area.

Figure 31A:
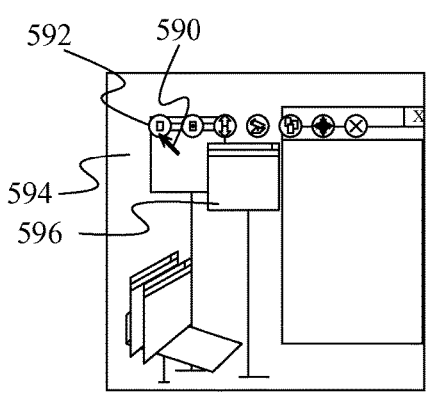
FIGS. 31A-31C show selected frames from the animated movement of a window from the loose stack to the primary viewing location in place of an existing window in the primary viewing location using button icons.
Figure 31B:
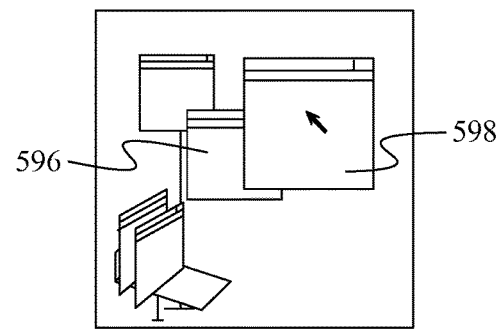
Figure 31C:
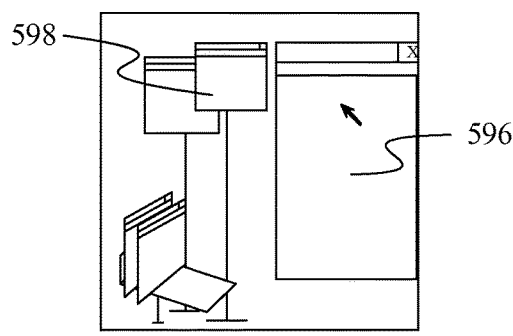
Figure 32C:
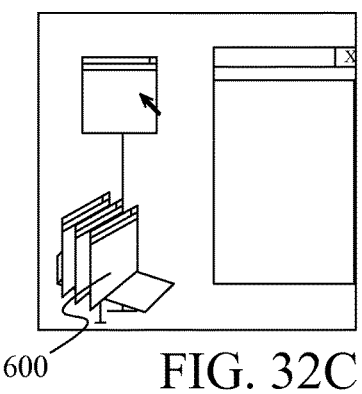

Primary view button 528 of FIG. 27 can also be used to move a window from a loose stack to the primary view. FIGS. 31A through 31C show selected frames of an animation depicting such an event. In particular, FIG. 31A shows a cursor 590 placed over a primary view button 592 of button icons 594. Button icons 594 were generated by the user interface in response to cursor 590 being positioned over loose stack window 596.

When the user clicks on primary view button 592, window 596 moves forward and current window 598 moves back toward the loose stack. FIG. 31B shows a frame during a portion of this movement. FIG. 31C shows the final orientation of windows 596 and 598.

A user can add additional windows to the primary viewing area without removing existing windows from the primary viewing area by using add-to-selection button 536 of FIG. 27. When the user selects this button for a window in the loose stack or the ordered stack, the window moves to the primary viewing area and the existing windows in the primary viewing area are moved to accommodate the new window. In one embodiment, the windows in the primary viewing area are positioned so that they appear to be the same size as discussed further below.

Figure 32A:
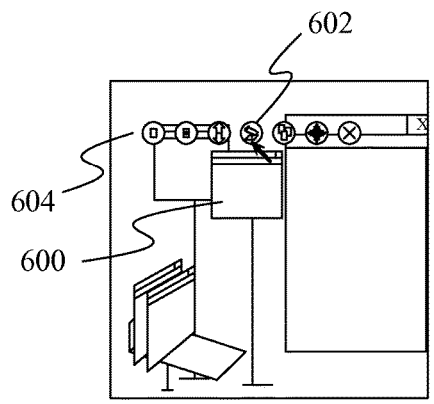
FIGS. 32A-32C show selected frames from the animated movement of a window from the loose stack to the ordered stack using button icons.
Figure 32B:
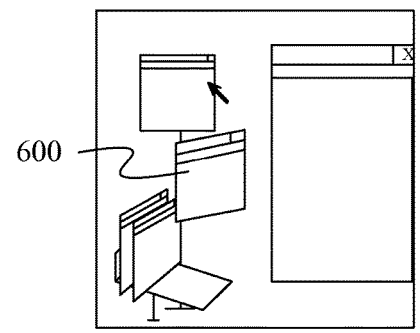
Figure 33A:
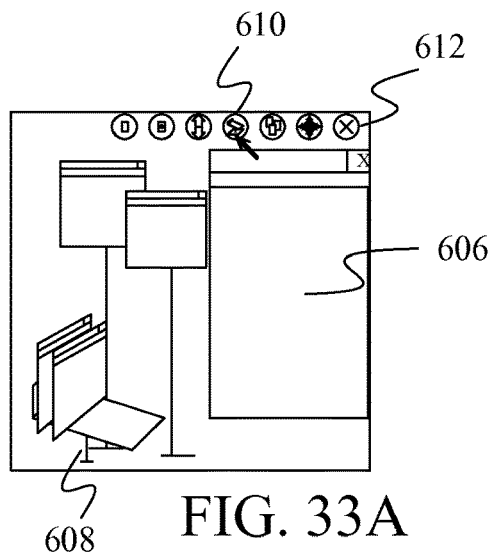
FIGS. 33A-33C show selected frames from the animated movement of a window from the primary viewing location to the ordered stack using button icons.
Figure 33B:
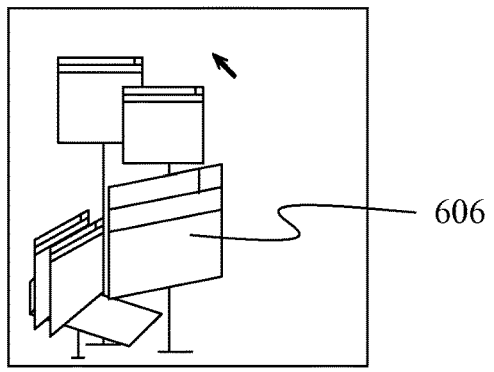
Figure 33C:
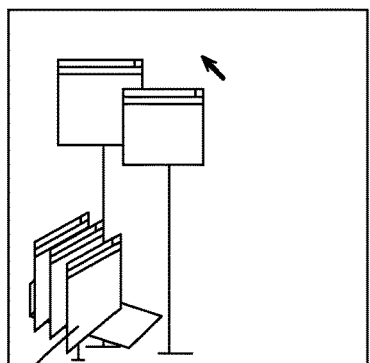

Button icons 524 of FIG. 27 also include an ordered stack button 530 that can be used to move windows from the primary viewing area to the ordered stack and from the loose stack to the ordered stack. FIG. 32A through 32B show selected frames of movement of a window 600 from the loose stack to the ordered stack. The movement of window 600 is initiated by the user clicking on ordered stack button 602 of button icons 604. FIGS. 33A through 33C show the movement of a window 606 from the primary viewing area to ordered stack 608 when the user clicks on ordered stack button 610 of button icons 612.

Figure 34A:
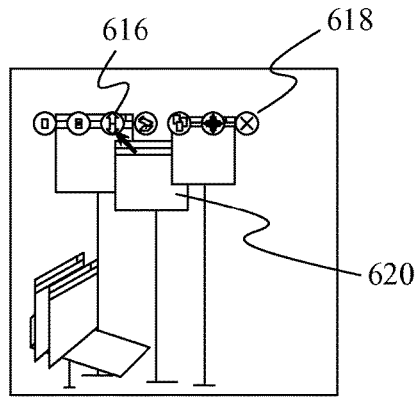
FIGS. 34A-34C show selected frames from the animated movement of a window within the loose stack using button icons.
Figure 34B:
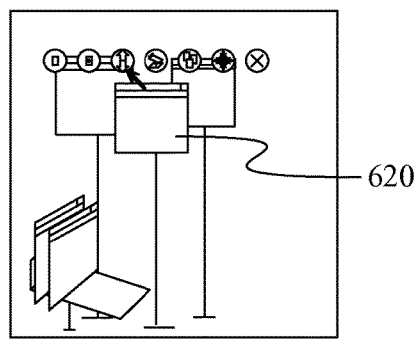
Figure 34C:
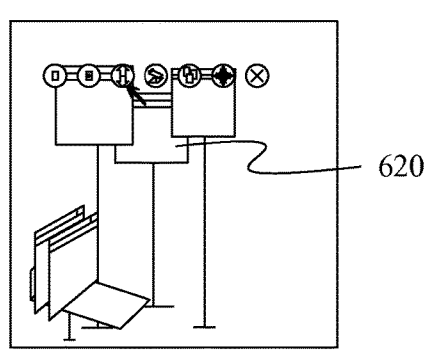

Button icons 524 of FIG. 27 also include a push back/pull forward button 532. As shown in FIGS. 34A through 34C, the user can use button 532 to push a window in a loose stack back or pull the window forward in the loose stack. In FIG. 34A, the user has selected push back/pull forward button 616 of button icons 618, which was displayed when the user placed the cursor over loose stack window 620. While depressing the primary button on a pointing device, the user can pull loose stack window 620 forward in the loose stack by moving the pointing device backward. The result of such an operation is shown in FIG. 34B, where loose stack window 620 is shown at the front of the loose stack. The user may also push loose stack window 620 to the back of the loose stack by moving the pointing device forward. The result of this operation is shown in FIG. 34C.

Figure 35A:
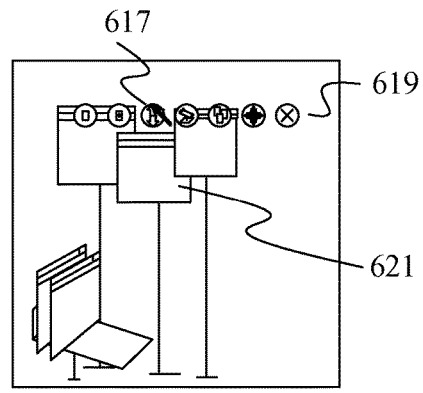
FIGS. 35A-35C show selected frames from the animated movement of a window within the loose stack using a second embodiment of button icons.
Figure 35B:
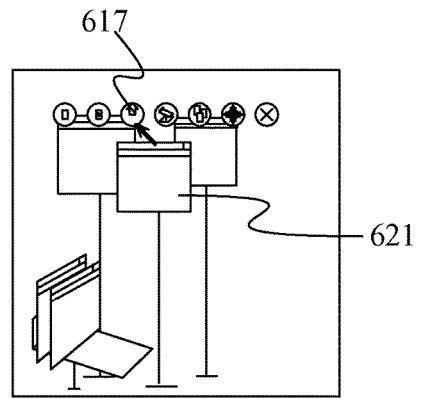
Figure 35C:
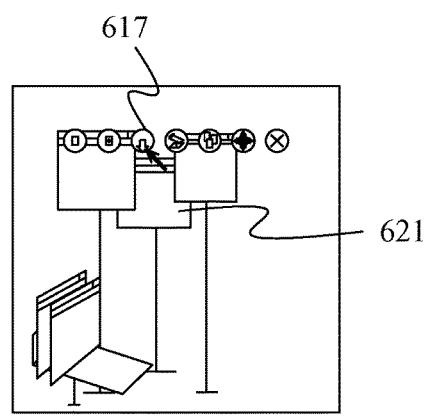

In an alternative embodiment, push back/pull forward button 532 of FIG. 27 is divided into an upper selectable arrow 531 and a lower selectable arrow 533. As shown in FIG. 35A, when a window 621 is located in the middle of a loose stack both the upper selectable arrow and the lower selectable arrow are shown in push back/pull forward button 617 of button icons 619. By positioning the cursor, the user can select either the upper arrow or the lower arrow. If the user selects the upper arrow, window 621 is pushed to the back of the loose stack as shown in FIG. 35C. If the user selects the lower arrow, window 621 is pulled to the front of the stack as shown in FIG. 35B. In one embodiment, the upper arrow and the lower arrow are rendered in three-dimensional perspective such that the upper arrow appears smaller than the lower arrow. This helps to indicate to the user that the upper arrow will push windows to the back and that the lower arrow will pull windows to the front.

When window 621 is at the front of the stack, the lower arrow is removed from button 617 as shown in FIG. 35B. Similarly, when window 621 is at the back of the loose stack, the upper arrow is removed from button 617 as shown in FIG. 35C.

Figure 36A:
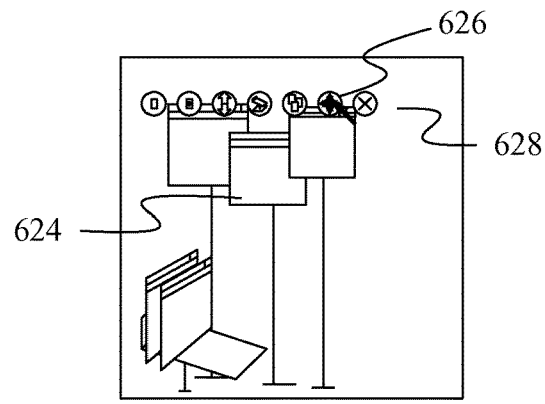
FIGS. 36A-36C show selected frames from the dragging of a window within the loose stack using button icons.
Figure 36B:
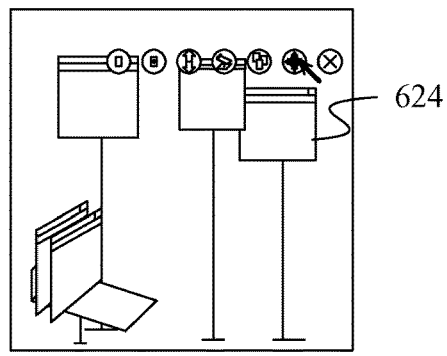
Figure 36C:
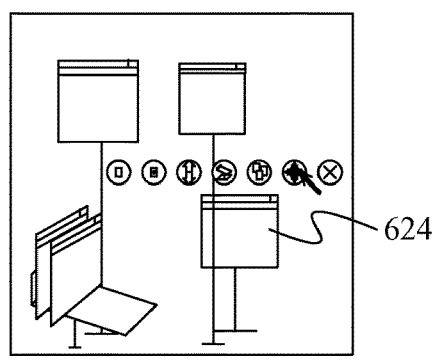

Button icons 524 of FIG. 27 also include a move button 534, which the user may use to relocate a window within the loose stack or the ordered stack. FIGS. 36A through 36C show movement of a loose stack window 624 using a location button 626 of button icons 628. In FIG. 36A, the user has selected location button 626 from button icons 628. While depressing a primary button on a pointing device, the user is able to move window 624 vertically and laterally within the loose stack. As shown in FIG. 36B, the user has moved window 624 laterally within the loose stack. As shown in FIG. 36C, the user has moved window 624 down and to the left within the loose stack.

The move button may also be used to provide arbitrary movement in depth while dragging the button. In one specific embodiment, holding the shift key while dragging causes the window to move away from the user and holding the control key while dragging causes the window to move toward the user.

A move button may also be used to reorder windows within an ordered stack as shown in FIGS. 37A through 37F. In FIG. 37A, the user has selected move button 630 of button icons 632. While depressing a primary button on a pointing device, the user can move window 634 as shown in FIGS. 37B and 37C by moving the pointing device. In FIG. 37D, the user has released the primary button of the pointing device and moved the cursor away from button 630. This in turn has caused button icons 632 to disappear in FIG. 37D.

In FIG. 37E, the user interface automatically moves windows 636 and 634 within the ordered stack. As shown in FIG. 37E, this involves moving window 636 back in the ordered stack and moving window 634 down toward the ordered stack. FIG. 37F shows the result of the reordering done by the user and the automatic positioning done by the user interface.

A user may also close a window using a close button 537 of icons 524. When a user clicks on close button 537, the window associated with the button icons disappears from the screen along with the button icons.

The order of the button icons shown in FIG. 27 represents only a single possible embodiment. Other orders for these buttons are within the scope of the invention. In addition, the buttons may be arranged in other possible layouts within the scope of the present invention. For example, the buttons may be arranged in an arc around one of the corners of the window. This aids the user in consistently and quickly acquiring the buttons for purposes of interaction.

Various embodiments of the present invention also use a variety of strategies for attaching the button icons to a window. In one embodiment, the button row moves in all three dimensions with the window such that when the window moves away from the user, the button row appears to get smaller. In some embodiments, the row of buttons tilts with the window as the window tilts. In further embodiments, the button row tilts as the window tilts but during the tilt operation the buttons are simultaneously resized and rearranged such that each button remains a constant size (in pixels) on the screen and the spacing between the buttons remains constant in pixels.

When an embodiment is used where the row of buttons does not tilt or move forward and back with the window, various visual cues can be used to suggest the association between the row of buttons and the selected window. For example, semi-transparent geometric objects can stretch between the boundary of the row of buttons and the top edge of the selected window. Alternatively, lines may be drawn between each button and an associated location on the selected window. In further embodiments, various combinations of lines and planar objects are used together to further the visual correspondence.

Multiple Windows in the Primary Viewing Area

Figure 38A:
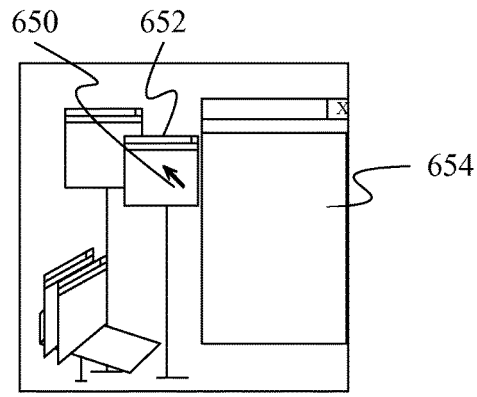

Under an embodiment of the present invention, multiple windows can be placed in the primary viewing area. FIGS. 38A through 38J depict selected frames showing the placement of multiple windows in the primary viewing area. In FIG. 38A, the user has positioned a cursor 650 over a loose stack window 652. The user then indicates that they wish to add window 652 to the primary viewing area. In the embodiment of Table 1, this is accomplished by depressing the shift key on the keyboard while clicking the primary button of the pointing device. In the pop-up menu embodiment of FIG. 27, this is accomplished by selecting add window button 536.

Figure 38B:
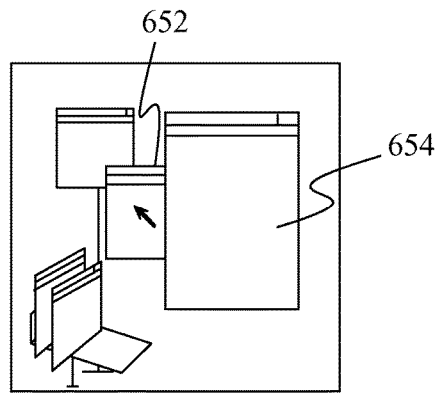

In response to this input, the user interface of the present invention pushes current focus window 654 back in the display while bringing loose stack window 652 forward in the display. A frame from this motion is shown in FIG. 38B. As loose stack window 652 is moved into the primary viewing area, the object associated with window 652 is removed from the loose stack container object and is placed into the primary view container object. In addition, window 652 is designated as the focus window in the primary viewing area.

Figure 38C:
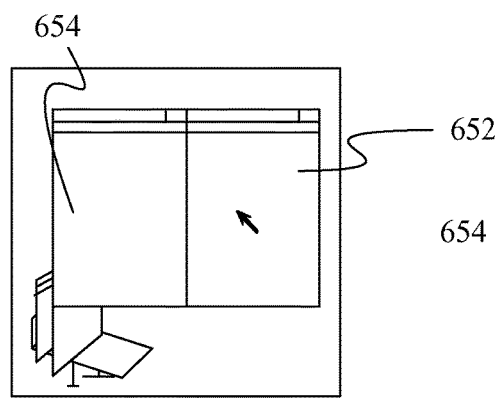

When window 652 reaches the primary viewing area, it is the same distance from the user as window 654 with which it shares the primary viewing area. Thus, the user does not have to manipulate the shape or location of either window in order to view both windows in the primary viewing area. The result of moving window 652 into the primary viewing area is shown in FIG. 38C. In other embodiments, the windows are placed at different distances from the user so that the windows appear the same size to the user and so that the windows do not obscure each other. In still, other embodiments, the windows are scaled so that they appear the same size in the primary viewing area. In the context of this application, such scaling can be considered a way of positioning the windows.

Figure 38D:
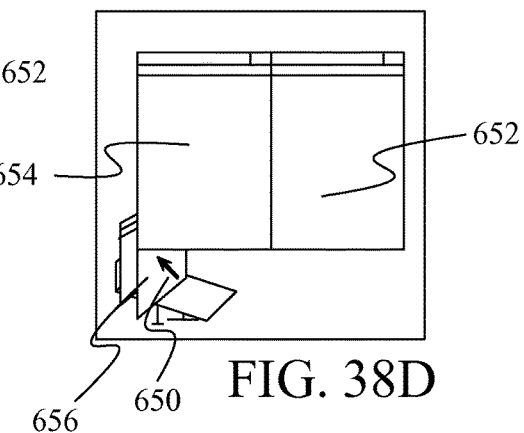
Figure 38E:
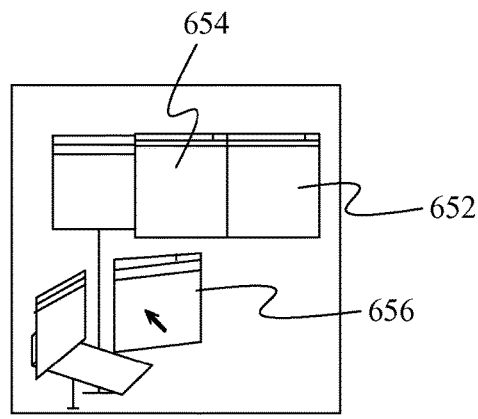
Figure 38F:
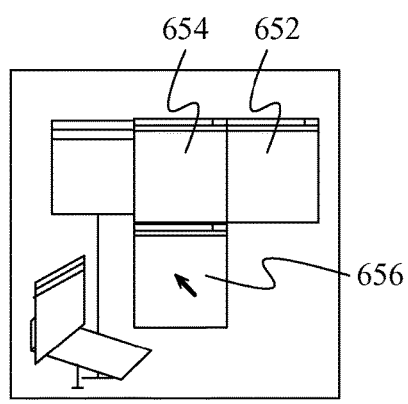

More than two windows may be added to the primary view. In FIG. 38D the user positions cursor 650 over an ordered stack window 656 and indicates that they wish to add that window to the preferred viewing area. Using the embodiment of Table 1, this involves pressing the shift key while clicking the primary button of the pointing device. In the embodiment of FIG. 27, this involves selecting the add-to-selection button 536 of button icons 524. In response to the user input, the user interface pushes windows 652 and 654 back in the display while bringing windows 656 forward and to the right. A frame from this motion is shown in FIG. 37E. In FIG. 38F, it can be seen that each of the windows 652, 654, and 656 in the primary viewing area are of generally the same size and shape. The repositioning of the windows is done automatically by the user interface of the present invention so that the user does not have to manipulate these features of the windows in order to view all of the windows in the primary viewing area. In one embodiment, window 656 is given focus as it is moved into the primary viewing area.

A fourth window may be added to the primary viewing area by selecting an additional window to add to the primary viewing area as shown in FIG. 38G. In FIG. 38G, the user has selected a window 660 to add to the primary viewing area. In FIGS. 38H and 38I, window 660 is moved forward toward a preferred viewing area defined by windows 652, 654 and 656. In FIG. 38J window 660 reaches its final position within the preferred viewing area and is designated as the focus window.

The present invention is not limited to any particular number of windows that may be added to the primary viewing area. For example, in one embodiment ten windows may be placed in the primary viewing area.

Movement of the Loose Stack and Ordered Stack

In some embodiments, the locations of the ordered stack and/or the loose stack are changed dynamically as windows are moved into and out of the primary viewing area. This movement is designed to keep at least a part of both the loose stack and the ordered stack in view when windows are placed in the primary viewing area.

Glances

Embodiments of the present invention utilize a glancing technique to allow the user to look ephemerally to their left and right and up and down. For example, under one embodiment, if the user clicks on left glance control 441 of FIG. 16, an animation is started that rotates the camera to the left. The user is then able to see the area to the left of the virtual user. When the camera has been rotated ninety-degrees, the image is held for one second and then a second animation is generated to simulate the rotation of the camera back to the forward position. Similar glancing animations can be invoked to view the spaces to the right, above and below the virtual user by clicking on glancing controls 443, 437 and 439 respectively. Any one of these glances can be held by clicking and holding on the respective control. When the control is released, the rotation animation toward the forward view is invoked.

In some embodiments, glancing can be used to expose tool spaces that travel with the virtual user in the task gallery. The techniques for generating such tool spaces and for implementing glances to the tool spaces are discussed in detail in a U.S. patent application entitled "A METHOD AND APPARATUS FOR PROVIDING AND ACCESSING HIDDEN TOOL SPACES" filed on even date herewith, assigned to a common assignee and identified by U.S. patent application Ser. No. 09/541,133.

In summary, a tool space is a container object that contains and displays images of other objects. The tool space container object is different from other container objects described above in that the tool space container object travels with the virtual user and can be seen by using a glancing technique or by activating a tool space control. In a glancing technique, the camera associated with the virtual user is rotated while the virtual user's body remains in a fixed position. If the virtual user's body is rotated toward the tool space, the tool space rotates with the user such that the user does not see the tool space. To invoke a glance, the user utilizes a glancing gesture, which can involve a combination of keystrokes, a combination of keystrokes and pointing device inputs, just primary pointing device inputs, or the use of a secondary pointing device such as a touch pad. In some embodiments, glancing is invoked using movement controls 428 of FIG. 16. Specifically, glancing controls 437, 439, 441, and 443 are used to invoke glances up, down, left, and right, respectively.

In other embodiments, the user displays a tool space without performing a glancing gesture. For example, in one embodiment, the user can display a tool space by selecting the hands of the displayed FIG. 445 in FIG. 16. In one such embodiment, the system displays an animation in which the tool space rotates into the user's current view. In such cases, when the user invokes a glance to the left or right they see the left and right side walls but do not see a tool space. The tool space can be dismissed by clicking on the tool space control again or by selecting an object in the tool space. When the tool space is dismissed, an animation is displayed in which the tool space appears to return to the place it originally came from.

Glances to the Three-Dimensional Start Palette

Figure 39A:
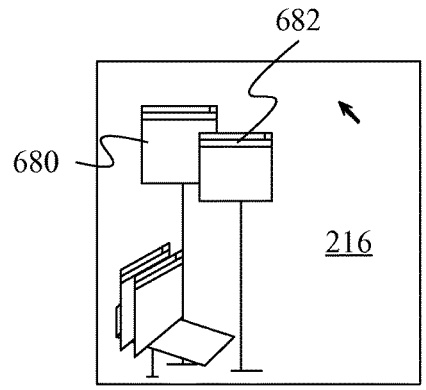
FIGS. 39A-39C show selected frames from an animated movement associated with glancing at the left tool space.
Figure 39B:
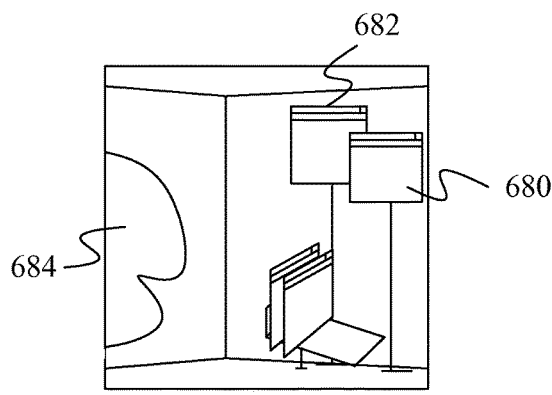
Figure 39C:
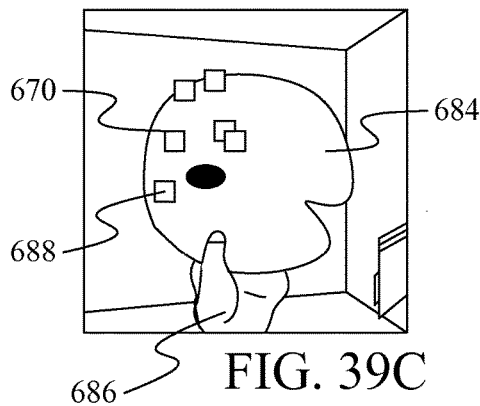

FIGS. 39A through 39C show selected frames from an animated glance toward a left tool space. In FIG. 39A, the virtual user is positioned in front of stage 217 at the home viewing location. Upon receiving the glance gesture, the user interface rotates the view to the left such that windows 680 and 682 rotate to the right in the display. As the view rotates left, the left tool space comes into view. In the embodiment of FIGS. 39A, 39B, and 39C the left tool space is depicted as a palette 684. In FIG. 39C, the rotation is complete so that all of palette 684 can be seen. In the embodiment of FIG. 39C, the user's hand is shown holding palette 684 to give the user a sense of depth perception as to the location of palette 684, and to indicate the size of palette 684.

Palette 684 of FIG. 39C contains a number of three-dimensional objects such as objects 688 and 670. Objects 670 and 688 may be moved by placing a cursor over the object and using a dragging technique.

In one embodiment, palette 684 is a data mountain as described in a co-pending U.S. patent application having Ser. No. 09/152,491, filed on Sep. 14, 1998, and entitled METHODS, APPARATUS AND DATA STRUCTURES FOR PROVIDING A USER INTERFACE, WHICH EXPLOITS SPATIAL MEMORY IN THREE-DIMENSIONS, TO OBJECTS." In such an embodiment, objects, such as objects 670 and 688 are prevented from being moved such that one object obscures another object. In particular, if an object begins to substantially cover another object, the other object moves to the side so that it remains in view.

Selecting an Application from the Three-Dimensional Start Palette

In one embodiment, the objects on a start palette such as palette 684 represent applications that can run on the same computer that is generating the three-dimensional computer interface of the present invention. By clicking on an object such as object 690 in FIG. 40A, a user of the present invention can cause the application to begin executing. If the application then opens a window, the present invention will redirect the window that is drawn by the application so that the window appears in the primary viewing area of the current task. The user interface of the present invention then dismisses the tool space either by rotating the tool space out of the user's forward view (non-glancing tool space embodiments) or by rotating the user's view from the side glance (glancing tool space embodiments) back to the primary task so that the user may see the newly opened window.

Figure 40A:
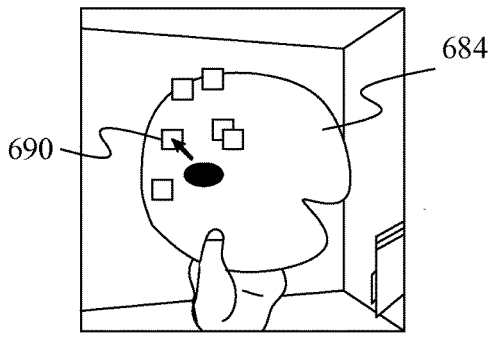
FIGS. 40A-40C show selected frames from an animated movement associated with returning to a forward view after selecting an application from the left tool space.
Figure 40B:
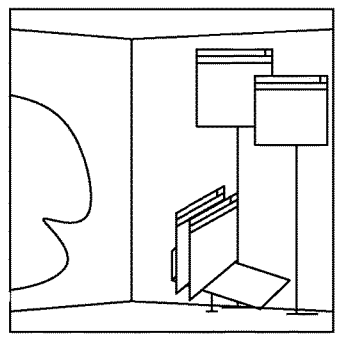
Figure 40C:
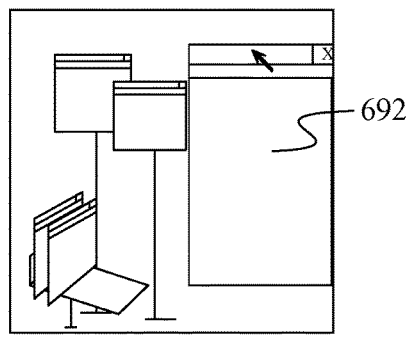

FIG. 40B shows the beginning of a rotation back to the primary task from a side glance and FIG. 40C shows a return to the full view of the primary task showing newly opened window 692 which is associated with application 690 of FIG. 40A. Because palette 684 can include a number of objects representing applications, it serves the function of current two-dimensional Start Menus and favorites. Thus, palette 684 can be viewed as a three-dimensional Start Menu.

In some embodiments, the user can launch multiple applications during a single viewing of the start palette. In one specific embodiment, the user holds the shift key while selecting individual items. Instead of launching the selected items, the system changes the appearance of the icons to mark the icons as having been selected. When a user clicks on an already marked item, the tool space is dismissed and all of the selected applications are launched.

Although the left tool space has been described in connection with palette 684, those skilled in the art will recognize that the tool space can take any shape.

Glancing to the Right Tool Space

Figure 41A:
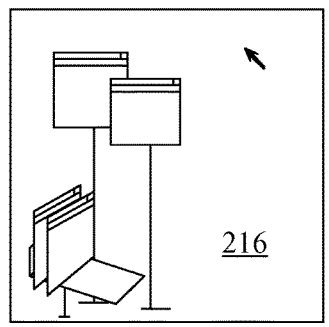
FIGS. 41A-41C show selected frames from an animated movement associated with glancing at the right tool space.
Figure 41B:
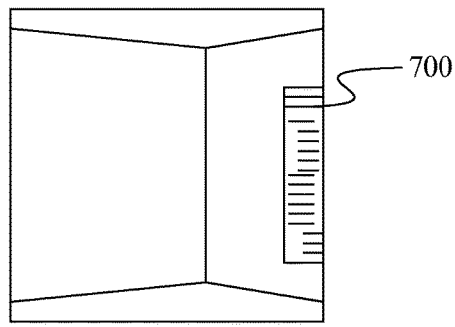
Figure 41C:
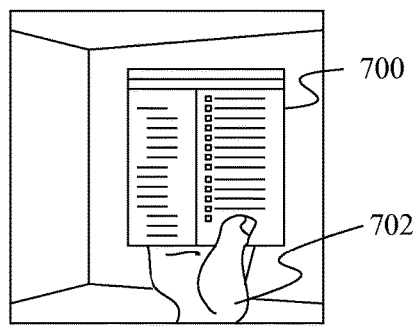

In one embodiment, the task gallery also includes a right tool space, which the user can rotate to using a glancing gesture to the right. This causes the rotation of the display as shown in FIGS. 41A, 41B and 41C. FIG. 41A shows an initial view of the current task on stage 216. FIG. 41B shows a rotation to the right exposing a portion of a right tool space 700. FIG. 41C shows the complete rotation to the right tool space 700.

In the embodiment of FIG. 41C, right tool space 700 is a single window, which is generated by a file manager program such as Windows Explorer from Microsoft Corporation. In FIG. 41C, a hand 702 is shown holding a window of tool space 700. Hand 702 gives the user some perspective on the size and position of tool space 700 relative to their viewpoint. As those skilled in the art will recognize, tool space 700 can take on many different appearances and the appearance shown in FIG. 41C is only one example.

In an embodiment in which the right tool space contains a file manager such as the menu provided by Microsoft Windows Explorer, the user may invoke an application or open a document simply by selecting the application or document's entry in the file list.

Figure 42A:
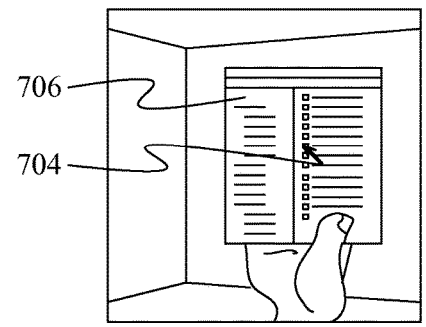
FIGS. 42A-42C show selected frames from an animated movement associated with returning to a forward view after selecting an application from the right tool space.
Figure 42B:
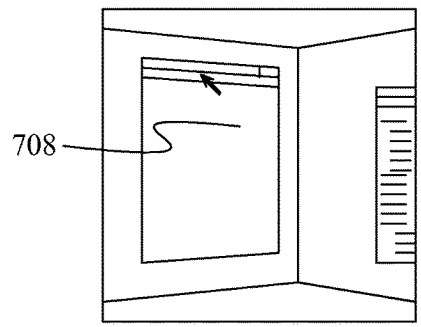
Figure 42C:
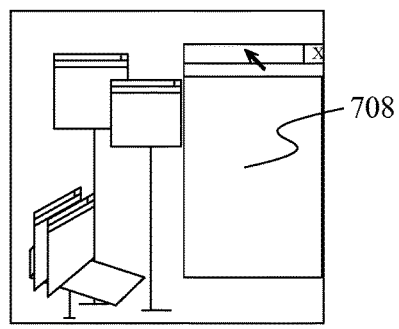

As shown in FIGS. 42A through 42C, if the user selects an application or document in the file list, the application will be started and if the application has an associated window, the window will be put in the primary viewing area of the current task. For example, in FIG. 42A where the user selects an entry 704 from file manager 706, the application associated with that entry is started. The user interface then rotates the view back to the current task as shown in FIGS. 42B and 42C to expose a window 708, which was created by the selected application and redirected to the primary viewing area by the user interface.

Glancing at the Up Tool Space

Embodiments of the present invention can also include an up tool space, which may be accessed by performing an upward glancing gesture. FIGS. 43A through 43C depict frames from an animation that is generated when a user performs an upward glancing gesture. Specifically, FIG. 43A shows an initial view of a current task on stage 216. Upon receiving the upward glancing gesture, the user interface rotates the view upward causing the windows of the current task to move downward. As shown in FIG. 43B, this gradually exposes the up tool space until the entire up tool space 712 becomes visible as shown in FIG. 43C.

Glancing at the Down Tool Space

Some embodiments of the invention also include a down tool space, which may be accessed using a downward glancing gesture. FIGS. 44A through 44C show frames of an animated rotation downward to expose the down tool space. In particular, FIG. 44A shows an initial view of a current task on stage 216. FIG. 44B shows a frame from the middle of the downward rotation to the down tool space showing a portion of down tool space 714. FIG. 44C shows the result of the full rotation to the down tool space 714.

Down tool space 714 of FIG. 44C includes an image of shoes 716 and 718 meant to depict the virtual shoes of the user in the task gallery. In addition, down tool space 714 includes two past dialog boxes 720 and 722. Although shoes 716 and 718 and dialog boxes 720 and 722 are shown in down tool space 714, those skilled in the art will recognize that none of these items necessarily need to appear in down tool space 714 and that other items may be added to down tool space 714 in place of or in addition to the items shown in FIG. 44C.

Movement of Past Dialog Boxes to the Down Tool Space

The present inventors have recognized that in current operating systems, users may dismiss dialog boxes that contain valuable information before they really know what the boxes contain. Unfortunately, once the dialog box is dismissed, the user is not able to recover the text of the box.

To overcome this problem, an embodiment of the present invention stores past dialog boxes in the down tool space. Thus, past dialog boxes 720 and 722 in FIG. 44C are examples of dialog boxes that have been dismissed by the user.

In further embodiments of the invention, the user interface generates an animated motion of the dismissed dialog box toward the down tool space to indicate to the user that the dialog box has been moved to this tool space. FIGS. 45A through 45E provide selected frames of this animated motion.

Figure 45A:
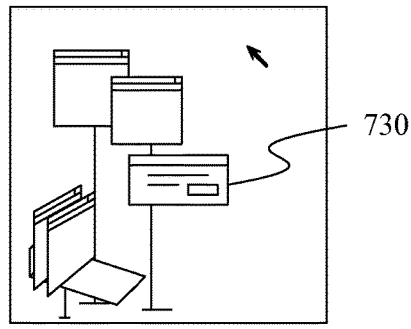
FIGS. 45A-45E show selected frames from an animated movement of a dismissed dialog box as it moves toward the down tool space.
Figure 45B:
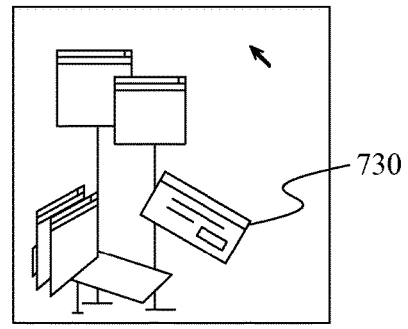
Figure 45C:
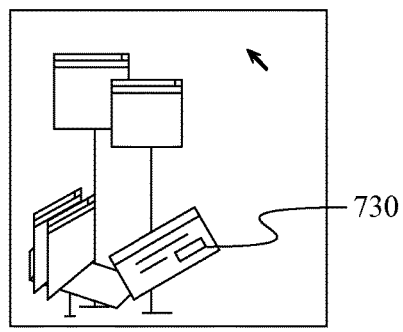
Figure 45D:
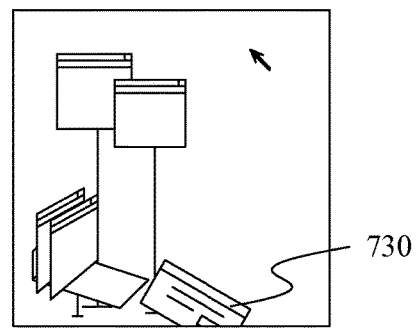
Figure 45E:
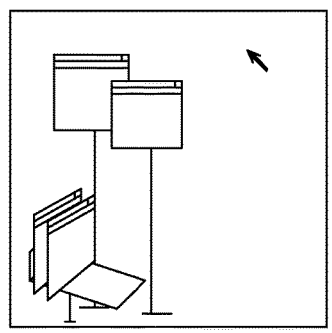

In FIG. 45A, a dialog box 730 is shown in the display. After the user dismisses the dialog box either by hitting enter or by selecting a display button within the dialog box, the user interface creates an animation in which dialog box 730 slowly drifts to the bottom of the screen as shown in FIGS. 45B, 45C, and 45D. Eventually, the dialog box drifts completely out of view as shown in FIG. 45E. If the user wishes to view the dialog box again, they execute a downward glancing gesture to access the down tool space as described above for FIGS. 44A through 44C.

Under some embodiments, the number or age of the dismissed dialog boxes displayed in the down tool space is controlled by the system. Thus, under one embodiment, dialogue boxes are removed from the down tool space after some period of time. In other embodiments, the oldest dialogue box is removed when a new dialogue box enters the down tool space.

Although the dismissed dialogue boxes are shown drifting to a down tool space, in other embodiments, the dismissed dialogue boxes move to other off-screen tool spaces. In addition, although the placement of dismissed dialogue boxes in a tool space is described in the context of a three-dimensional task gallery, this aspect of the invention may be practiced outside of the task gallery environment.

Movement of a Window from One Task to Another

Under an embodiment of the invention, the user may move a window from one task to another. In one embodiment, the user initiates such a move by invoking a menu using a secondary button on a pointing device. This menu, such as menu 732 in FIG. 46A includes an instruction to move the window. It also provides a secondary menu 734 that lists the task currently available in the task gallery. By moving the cursor over one of the tasks, and releasing the secondary button of the pointing device, the user can select the destination task for the window.

Figures 46A, 46B:
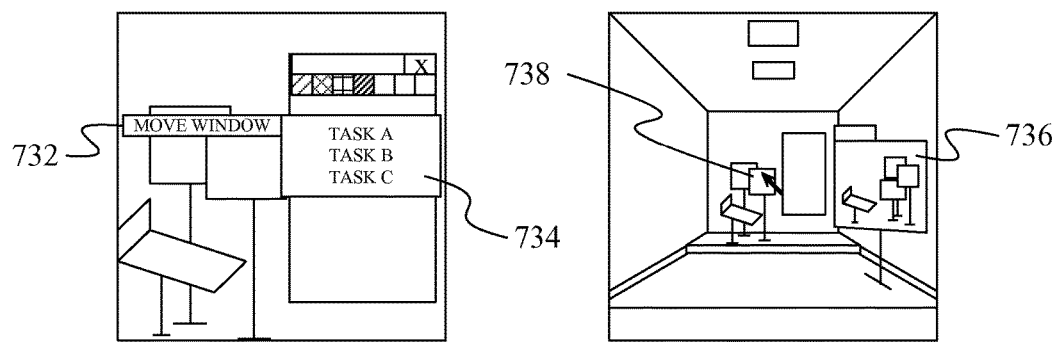
FIGS. 46A-46E show selected frames from an animated movement of a window from one task to another.
Figures 46C, 46D:
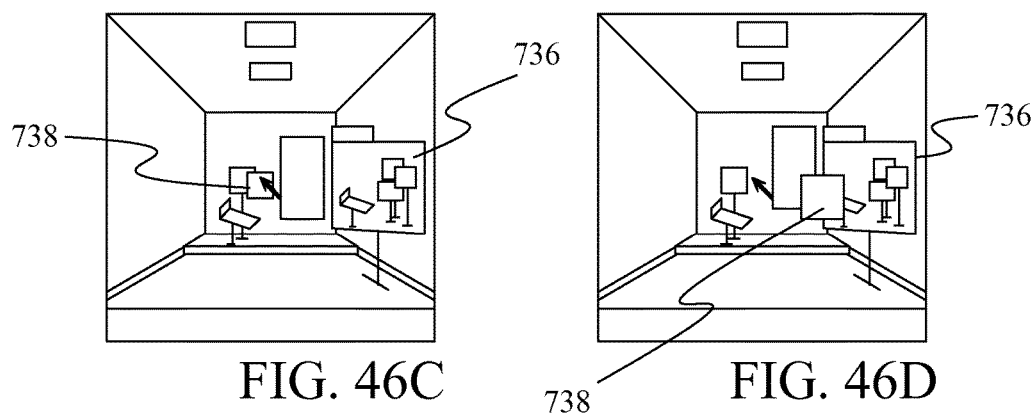
Figure 46E:
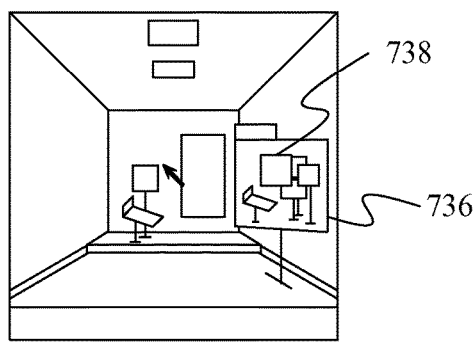

After the user makes their selection, the menus disappear as shown in FIG. 46B and the virtual user is moved back in the task gallery to expose the destination task. In FIG. 46B, the user has selected task 736 as the destination task. The user interface of this embodiment then removes the stand associated with window 738 as shown in FIG. 46C and moves window 738 to task 736 as shown in FIG. 46D. Window 738 is then added to the snapshot of task 736 as shown in FIG. 46E.

In further embodiments of the invention, the current task is replaced by the task that received the moved window. In such embodiments, the user interface provides an animated exchange of the two tasks as described above in connection with switching the current task.

Resizing Windows in the Primary Task

Figure 47A:
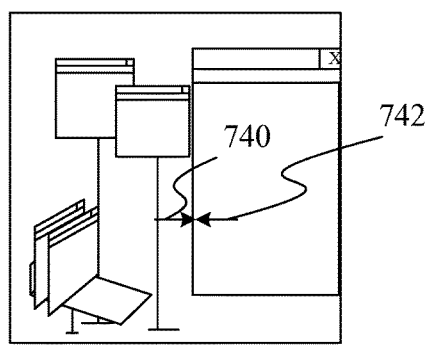
FIGS. 47A-47B show selected frames from an animated movement of a window boundary during resizing.
Figure 47B:
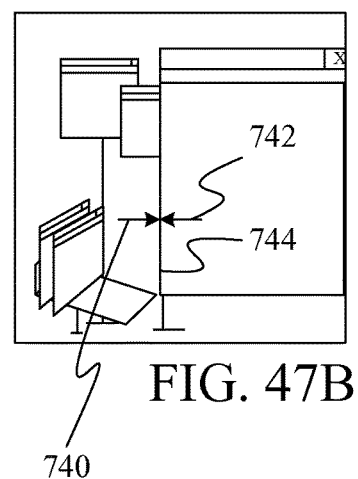

Under embodiments of the present invention, users may resize a window in the primary viewing area of the current task by positioning the cursor on the edge of the window until two resizing arrows, such as resizing arrows 740 and 742 of FIG. 47A, appear. Once resizing arrows 740 and 742 appear, the user depresses the primary button on the pointing device and moves the pointing device to establish the new location for the window border. Such border movement is shown in FIG. 47B where border 744 has been moved to the left with resizing arrows 740 and 742.

The resizing performed under the present invention differs from resizing performed in most two-dimensional window based operating systems. In particular, in most two-dimensional operating systems, window resizing is performed by the application itself. However, under many embodiments of the present invention, window resizing is performed by a three-dimensional shell, which creates the three-dimensional user interface. In particular, the three-dimensional shell defines a three-dimensional polygon on which the image of a window is applied as texture. Thus, upon receiving a resizing instruction, the three-dimensional shell changes the size of the polygon and reapplies the window texturing without conveying to the application that the application's window has been resized. Thus, both the window and the contents of the window are resized together under this technique of the present invention.

Code Block Diagram

Figure 48:
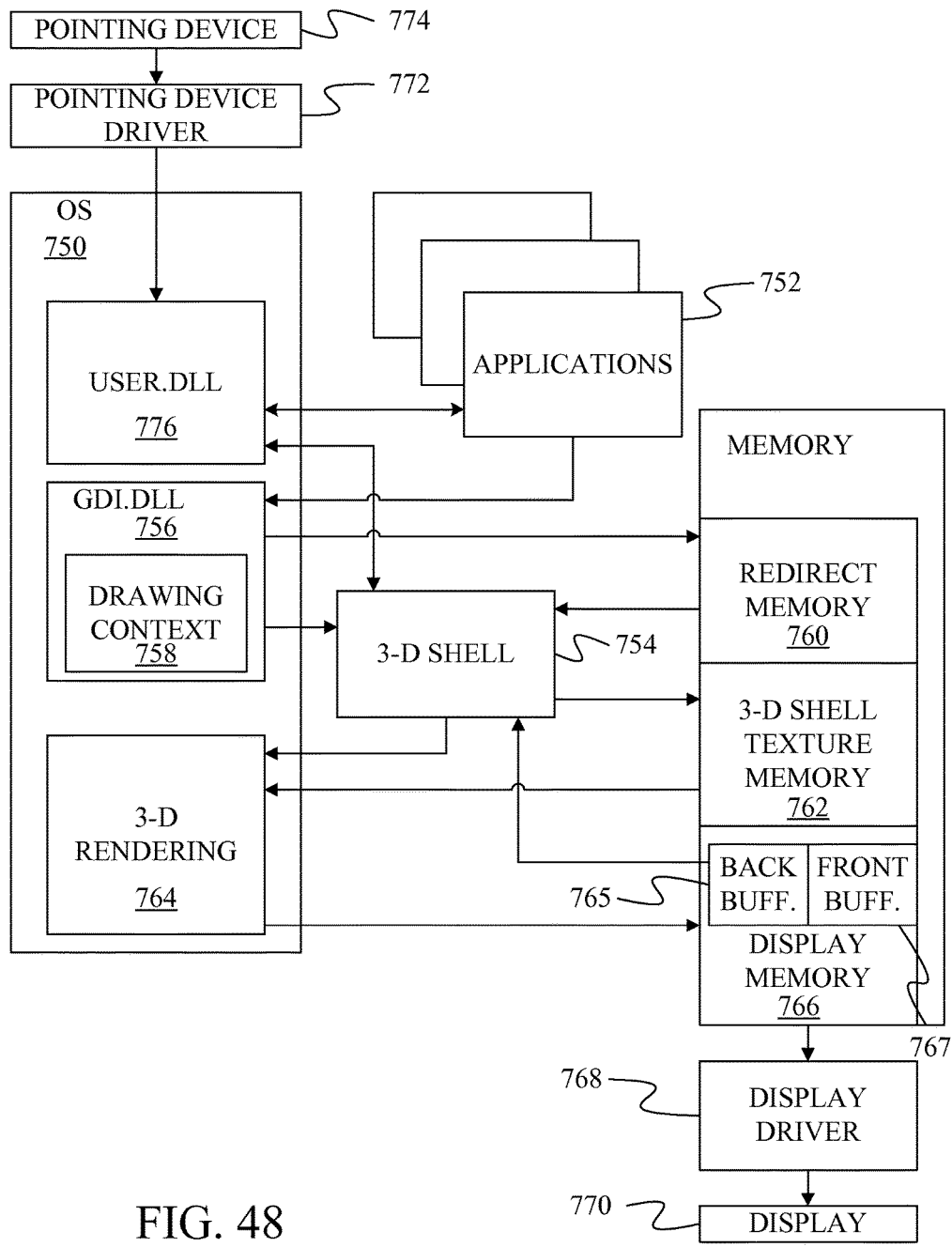
FIG. 48 is a block diagram of software and hardware elements of one embodiment of the present invention.

The operation of the three-dimensional shell discussed above is more fully described in connection with the block diagram of FIG. 48 which shows the hardware and code modules that are used in the present invention. In FIG. 48, an operating system 750 such as Windows® 2000 from Microsoft Corporation interacts with a set of applications 752 and a three-dimensional shell 754. Applications 752 are ignorant of the existence of three-dimensional shell 754 and are not aware that their associated windows are being displayed in a three-dimensional environment. To accomplish this, operating system 750 and three-dimensional shell 754 cooperate to redirect window display data from applications 752 into the three-dimensional environment. The operating system and three-dimensional shell also cooperate to modify pointing device messages before they are delivered to applications 752 unless the appropriate circumstances exist in the three-dimensional environment.

Figure 49:
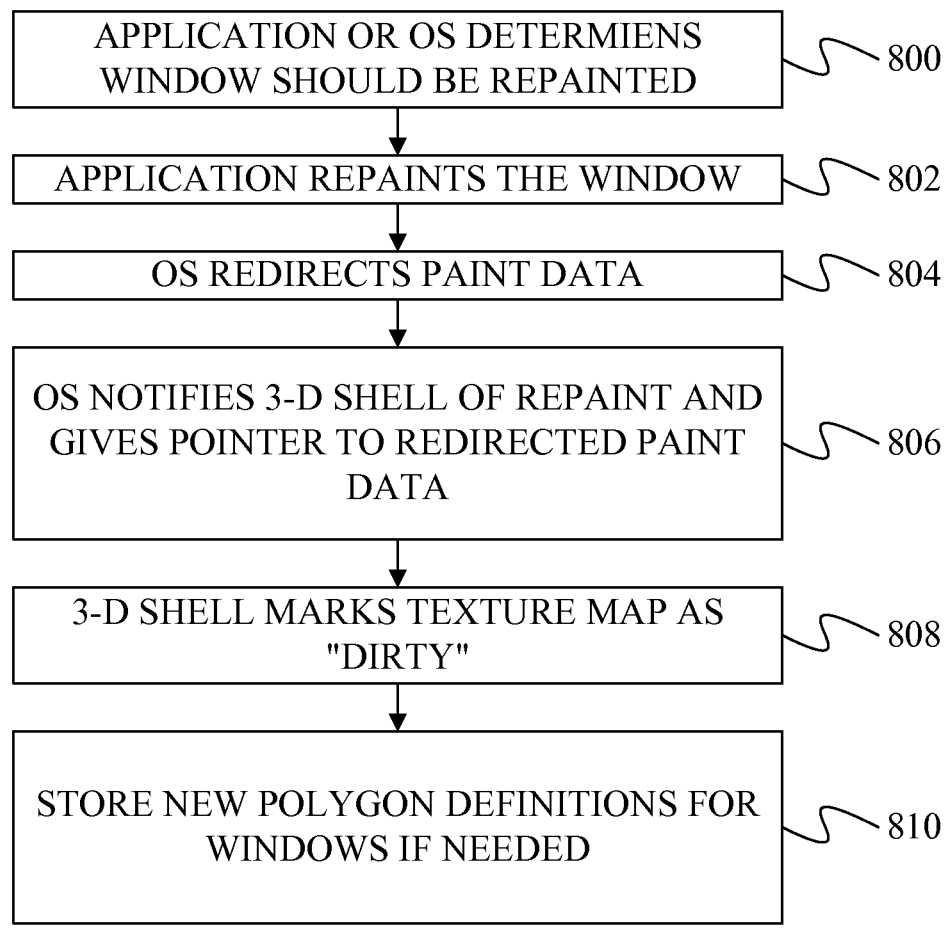
FIG. 49 is a flow diagram for redirecting window display data generated by an application.
Figure 50:
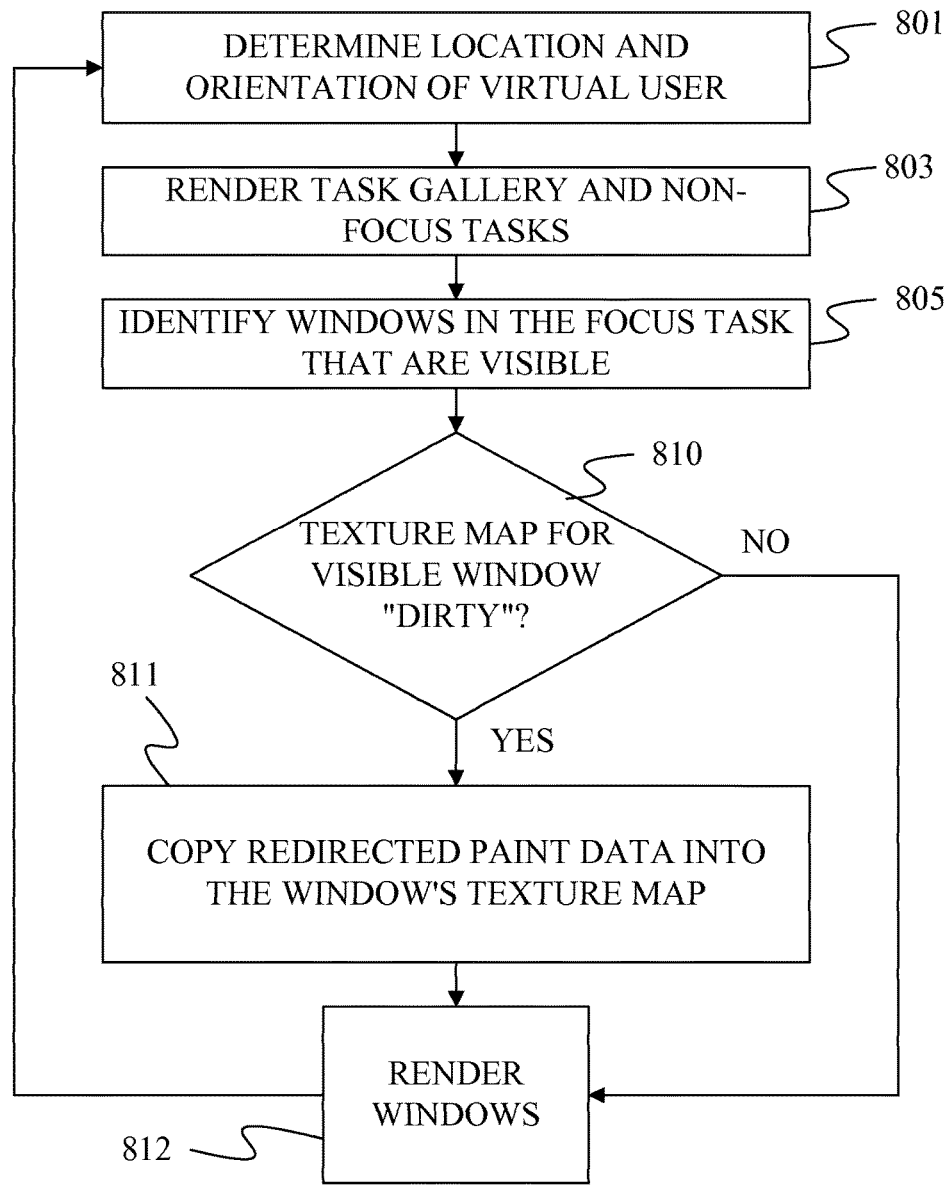
FIG. 50 is a flow diagram of an animation loop for rendering redirected window data.

The method of generating a three-dimensional interface of the present invention by redirecting the window data generated by applications 752 is discussed below with reference to the flow diagrams of FIGS. 49 and 50 and the block diagram of FIG. 48. The process of FIG. 49 begins with step 800 in which one of the applications 752 or the operating system 750 determines that a window should be repainted on the display. In this context, repainting the window means regenerating the image data corresponding to the appearance of the window on the display.

After it is determined that a window needs to be repainted, the associated application regenerates the display data at a step 802. This display data is then sent to operating system 750. In operating systems from Microsoft Corporation, the display data is routed to a graphics device interface 756 (GDI.DLL) within operating system 750. Graphics device interface 756 provides a standardized interface to applications and a specific interface to each of a collection of different types of displays. Graphics device interface 756 includes a set of drawing contexts 758 for each window generated by each of the applications 752. The drawing contexts 758 describe the location in memory where the display data is to be stored so that it can be accessed by a display driver.

Under the present invention, instead of directing the display data to a portion of the display memory, graphics device interface 756 redirects the data to a location in memory denoted as redirect memory 760 of FIG. 48. The redirection of the window data is shown as step 804 in FIG. 49. A further discussion of window redirection can be found in U.S. patent application Ser. No. 09/282,872, filed Mar. 31, 1999 and entitled DYNAMIC EFFECTS FOR COMPUTER DISPLAY WINDOWS.

After graphics device interface 756 has redirected the window display data, it notifies three-dimensional shell 754 that certain window data has been updated and provides a pointer to the redirected window display data in redirect memory 760. This occurs at step 806 of FIG. 49. At step 808, three-dimensional shell 754 marks the texture map associated with the update window as being "dirty".

At step 810, three-dimensional shell 754 stores a new polygon for any window that has had its shape changed. The polygon associated with a window determines the location and shape of the window in the three-dimensional display environment. For instance, in most of the screen examples described above, each window is a texture map on a rectangular polygon. By rotating and moving this polygon within the three-dimensional environment, and then applying the associated texture map containing the window data, the present invention can give the appearance of a three-dimensional window moving in the three-dimensional environment.

The images of the task gallery and the windows in the gallery are rendered using a three-dimensional rendering toolkit 764 such as Direct3D from Microsoft Corporation. Three-dimensional rendering toolkit 764 is used during an animation loop shown in FIG. 50. At step 801 of this loop, the location of the virtual user and the virtual user's orientation in the task gallery is determined. The task gallery and the non-focus tasks are then rendered at step 803 based on this user viewpoint. At step 805, three-dimensional shell 754 determines which windows in the focus task are in the current view. At step 810 three-dimensional shell 754 determines if any of the visible windows have had their texture map marked as dirty. If one of the visible windows has a "dirty" texture map, the redirected paint data is copied into the window's texture map at step 811. The windows are then rendered at step 812 by applying each windows texture map to its associated polygon.

The rendering produces display data that is stored in a back buffer 765 of a display memory 766. Back buffer 765 is then swapped with a front buffer 767 of display memory 766 so that back buffer 765 becomes the new front or display buffer 765. A display driver 768 then accesses new display buffer 765 to generate an image on a display 770.

Three-dimensional shell 754 also receives event notification when an application opens a new window. Such windows include new document windows, dialogue boxes and drop-down menus. Three-dimensional shell 754 selects a position for the new window based on the position of the window's parent window and the two-dimensional location indicated for the new window. Thus, a pull-down menu is positioned relative to its parent window in the three-dimensional environment so that it is in the same relative location within the parent window as it would be if both windows were in a two-dimensional environment. Likewise, a dialogue box that is designated by the application to appear in the center of the screen is positioned relative to its parent window in the three-dimensional environment.

Redirection of Pointer Device Inputs

In addition to redirecting the window display data created by an application, the present invention also modifies event data generated by a pointing device so that the event data reflects the position of the cursor in the three-dimensional environment relative to redirected windows that are displayed in the environment. These modifications are described with reference to the flow diagram of FIG. 51 and the block diagram of FIG. 48.

In step 820 of FIG. 51, a pointing device driver 772 of FIG. 48 generates a pointer event message based on the movement of a pointing device 774. Examples of pointing device 774 include a touch pad, a mouse, and a track ball. Operating system 750 receives the pointer event message and in step 822 determines screen coordinates for a cursor based on the pointer event message. In operating systems from Microsoft Corporation, the screen coordinates are determined by a dynamic linked library (DLL) shown as USER.DLL 776 in FIG. 51.

In step 824, operating system 750 notifies three-dimensional shell 754 that a pointing device event has occurred. In most embodiments, this notification is based on an event inspection mechanism (known generally as a low-level hit test hook) that three-dimensional shell 754 requests. With the hit test hook notification, operating system 750 includes the screen coordinates of the cursor.

At step 832, three-dimensional shell 754 determines if the cursor is over a redirected window in the focus task that is displayed on the stage. If the cursor is not over a window in the focus task, three-dimensional shell 754 does not change the event message at step 833 but instead returns the message to the operating system. The operating system then posts the unchanged message in the event queue for three-dimensional shell, which uses the posted event message as input for changing the three-dimensional environment at step 834. For example, if the cursor is over a task located along a side wall, the floor, or the ceiling of the task gallery, three-dimensional shell 754 may use the pointer event message as an input command for moving the task within the task gallery. Thus, if the user clicks on the task using the pointer device, three-dimensional shell 754 uses the clicking input as an instruction to make the selected task the focus task.

If the cursor is over a redirected window in the current task at step 832, three-dimensional shell 754 determines the two-dimensional position within the window at a step 836. Since windows within the current task can be rotated away from the user, the determination of the two-dimensional coordinates involves translating the coordinates of the cursor on the display first to a three-dimensional position in the virtual three-dimensional environment and then to a two-dimensional point on the surface of the polygon associated with the displayed window.

After calculating the two-dimensional position of cursor on the window, three-dimensional shell 754 determines if the window under the cursor is in the primary viewing area at step 838. If the window under the cursor is not in the primary viewing area, three-dimensional shell 754 changes the event message by replacing the cursor's screen coordinates with the two-dimensional coordinates of the cursor within the window at step 840. Three-dimensional shell 754 also changes the window handle in the event message so that it points at the window under the cursor and changes the message type to a cursor over message. In other words, if the pointer event message indicates a left button down on the pointer device, three-dimensional shell 754 would change this information into a cursor over message at step 840.

The reason for converting all pointer event messages into cursor over messages at step 840 is that applications that are not in the primary viewing area cannot receive pointer device input under some embodiments of the present invention. Even so, in many embodiments of the invention, it is considered advantageous to give each application the ability to change the shape of the cursor as the cursor moves over the application window. Thus, although an application does not receive button information when the application's window is not in the primary viewing area, it does receive cursor over information so that it may adjust the shape of the cursor.

If the window is in the primary viewing area at step 828, three-dimensional shell 754 determines if the cursor is in the client area of the window at step 842. If the cursor is not in the client area at step 842, the process continues at step 840 where the two-dimensional window coordinates of the cursor are placed in the event message and a window identifier that identifies the window below the cursor is placed in the event message.

After changing the event message at step 840, three-dimensional shell 754 uses the original pointer event message information as input for changing the three-dimensional environment at step 834. Thus, if the window is not in the primary viewing area, three-dimensional shell 754 can use the pointer device message to move a window within the loose stack or ordered stack, or move a window between the loose stack, the ordered stack and the primary view.

If the cursor is in the client area at step 842, the pointer event message is changed by changing the cursor coordinates to the two-dimensional coordinates of the cursor over the window in the three-dimensional environment and changing a window identifier so that it identifies the particular window that the cursor is over. Thus, if the original pointer event message indicated that the left button of the pointing device had been clicked and gave the screen coordinates of the cursor during that click, three-dimensional shell 754 would replace the screen coordinates with the two-dimensional coordinates identified by three-dimensional shell 754. This pointer event message is then routed by operating system 750 to the application associated with the identified window. Under this embodiment of the invention, the pointer event message returned by three-dimensional shell 754 appears to the application to have come from pointing device driver 772. Thus, applications 752 are ignorant of the fact that three-dimensional shell 754 exists or that their window is being displayed in a three-dimensional shell.

Although the present invention has been described with reference to particular embodiments, workers skilled in the art will recognize that changes may be made in form and detail without departing from the spirit and scope of the invention. In particular, although the present invention has been described with reference to operating systems from Microsoft Corporation, the components needed will be similar on other operating systems. For example, a computer system that uses the X Window System could be used to implement the present invention. It is noted that for such other systems the X server should run on the same machine as the client applications and the window manager so that bitmap sharing is efficient.

What is claimed is:

1. A computer-implemented method comprising:
generating a user interface display that includes a visual representation of a three-dimensional space having at least:
a ceiling display area that visually represents a ceiling in the three-dimensional space,
a floor display area that visually represents a floor in the three-dimensional space, and
a stage display area that visually represents a stage that is spaced apart from the floor in the three-dimensional space;
generating a task display element having a first image that represents a task associated with an application, wherein the task display element
is at a first location in the three-dimensional space apart from the stage display area, and
has an inactive state;
based on a user input associated with the first image, modifying the user interface display to
visually move the task display element from the first location to a second location in the stage display area, and
include a second image that represents the task at the first location in the three-dimensional space, wherein the second image is displayed after the first image is moved to the stage display area and has a dimmed appearance relative to the first image; and
automatically changing the task display element from the inactive state to an active state at the second location; and
based on user interaction with the task display element having the active state at the second location, performing a computing action that is associated with the task in the application.

2. The computer-implemented method of claim 1, wherein the display element comprises a representation of a plurality of windows, the user interaction with the display element comprises a user input that manipulates the windows and interacts with an application through the windows.

3. The computer-implemented method of claim 2, wherein the stage display area is positioned at a hallway display area forming by the floor display area, the ceiling display area, and the side wall display areas.

4. The computer-implemented method of claim 1, wherein the three-dimensional space has first and second side wall display areas, and the stage display area extends between the first and second side wall display areas.

5. The computer-implemented method of claim 1, wherein generating a display element at the first location comprises displaying a stand display element beneath the display element.

6. The computer-implemented method of claim 5, wherein moving the task display element comprising leaving the stand display element at the first location such that the stand display element is displayed beneath the second image at the first location.

7. The computer-implemented method of claim 1, wherein receiving a user input comprises receiving a user selection input that selects the task display element, the method further comprising:

modifying, in response to the user selection input, a visual appearance of the first image to indicate user selection of the task.

8. The computer-implemented method of claim 7, wherein modifying the visual appearance of the first image comprises at least one of:
modifying a border of the first image;
modifying a background of the first image; and
providing the first image with a textual cue.

9. The computer-implemented method of claim 1, wherein the stage display element is positioned at an end wall display area formed by the floor display area, the ceiling display area, and at least one side wall display area, and wherein moving the task display element to the second location comprises:
expanding the first image to fill substantially all of the end wall display area.

10. A computer-implemented method comprising:
generating a user interface display that includes a visual representation of a three-dimensional space having at least:
a ceiling display element that visually represents a ceiling in the three-dimensional space, and
a floor display element that visually represents a floor in the three-dimensional space;
generating a task image that represents a task associated with an application;
generating a stand display element that represents a stand beneath the task image in the three-dimensional space, the stand display element visually connecting the task image to the floor display element;
expanding the stand display element as the task image is moved away from the floor display element toward the ceiling display element, such that the stand display element continues to visually connect the task image to the floor display element;
based on detecting that the task image has reached a ceiling display area proximate the ceiling display element, removing the stand display element from beneath the task image; and
based on user interaction with the task image, performing a computing action that is associated with the task in the application.

11. The method of claim 10, wherein the task image comprises a representation of at least one window.

12. The method of claim 10, and further comprising:
after the task image reaches the ceiling display image, displaying the task image with a bottom of the task image leaning toward an end wall display element of the three-dimensional space.

13. A computing system comprising:
a processor; and
memory storing instructions executable by the processor, wherein the instructions, when executed, configure the computing system to:
generate a user interface display that includes a visual representation of a three-dimensional space having at least:
a ceiling display area that visually represents a ceiling in the three-dimensional space,
a floor display area that visually represents a floor in the three-dimensional space, and
a stage display area that visually represents a stage that is spaced apart from the floor in the three-dimensional space;
generate a task display element having a first image that represents a task associated with an application, wherein the task display element is at a first location in the three-dimensional space apart from the stage display area;

based on a user input associated with the first image, modify the user interface display to visually move the task display element from the first location to a second location in the stage display area, and include a second image that represents the task at the first location in the three-dimensional space, wherein the second image is displayed after the first image is moved to the stage display area and has a dimmed appearance relative to the first image; and based on user interaction with the task display element at the second location, perform a computing action that is associated with the task in the application.

14. The computing system of claim 13, wherein the display element at the first location has an inactive state, and the instructions configure the computing system automatically change the display element from the inactive state to an active state at the second location.

15. The computing system of claim 13, wherein the three-dimensional space has first and second side wall display areas, and the stage display area extends between the first and second side wall display area, and the stage display area is positioned at a hallway display area formed by the floor display area, the ceiling display area, and the side wall display area.

16. The computing system of claim 13, wherein the instructions configure the computing system to display a stand display element beneath the display element at the first location.

17. The computing system of claim 16, wherein the instructions configure the computing system to move the task display element by leaving the stand display element at the first location such that the stand display element is displayed beneath the second image at the first location.

18. The computing system of claim 13, wherein the instructions configure the computing system to receive a user selection input that selects the task display element, and modify, in response to the user selection input, a visual appearance of the first image to indicate user selection of the task.

19. The computing system of claim 18, wherein modifying the visual appearance of the first image comprises at least one of:

modifying a border of the first image;

modifying a background of the first image; and providing the first image with a textual cue.

20. The computing system of claim 13, wherein the stage display element is positioned at an end wall display area formed by the floor display area, the ceiling display area, and at least one side wall display area, and wherein the task display element is moved to the second location by expanding the first image to fill substantially all of the end wall display area.

* * * * *